United States Patent
Chen

Patent Number: 5,886,736
Date of Patent: Mar. 23, 1999

[54] SYNCHRONIZATION OF A STEREOSCOPIC VIDEO SEQUENCE

[75] Inventor: Xuemin Chen, San Diego, Calif.

[73] Assignee: General Instrument Corporation, Horsham, Pa.

[21] Appl. No.: 736,383

[22] Filed: Oct. 24, 1996

[51] Int. Cl.[6] .................................................. H04N 13/00
[52] U.S. Cl. ........................ 348/43; 348/845.2; 348/42; 348/397
[58] Field of Search ................................ 348/43, 42, 44, 348/47, 401–402, 407, 409, 411–413, 416, 845.2, 845.3, 397, 398; H04N 13/00

[56] References Cited

U.S. PATENT DOCUMENTS

| | | | |
|---|---|---|---|
| 5,296,926 | 3/1994 | Nagura | 348/43 |
| 5,612,735 | 3/1997 | Haskell et al. | 348/43 |
| 5,619,256 | 4/1997 | Haskell et al. | 348/43 |
| 5,633,682 | 5/1997 | Tahara | 348/43 |
| 5,652,616 | 7/1997 | Chen et al. | 348/43 |

OTHER PUBLICATIONS

Gomi, "Stereoscopic Video Transmission and Presentation System for ISDN", IEEE Trans. on Consumer Electronics, vol. 36, No. 3, pp. 759–766, Aug. 1990.

Yamaguchi et al., "Stereoscopic Images Disparity for Predictive Coding" IEEE, pp. 1976–1979, Feb. 1989.

Ziegler, "Digital Stereoscopic Imaging & Applications A Way Towards New Dimensions The RACE II Project Distima", IEEE, pp. 1–4, Jan. 1992.

Schertz, "Source Coding of Stereoscopic Television Pictures", IEEE, pp. 462–464.

Song, "Improved Disparity Estimation Algorithm with MPEG–2's Scalability for Stereoscopic Sequences", IEEE Trans. on Consumer Electronics, vol. 42, No. 3, pp. 306–311, Aug. 1996.

Primary Examiner—Tommy P. Chin
Assistant Examiner—Vu Le
Attorney, Agent, or Firm—Barry R. Lipsitz; Ralph F. Hoppin

[57] ABSTRACT

In a stereoscopic video transmission system, video pictures of lower and enhancement layers are transmitted in a particular order such that the number of pictures which must be temporarily stored prior to presentation is minimized. Furthermore, a decode time stamp (DTS) and presentation time stamp (PTS) for each picture can be determined to provide synchronization between the lower layer and enhancement layer pictures. Decoding may occur either sequentially or in parallel. In particular, a method is presented where the enhancement layer includes disparity-predicted pictures which are predicted using corresponding lower layer pictures. The video pictures are ordered such that the disparity-predicted enhancement layer pictures are transmitted after the corresponding respective lower layer pictures. The scheme is illustrated with a number of different specific examples.

23 Claims, 6 Drawing Sheets

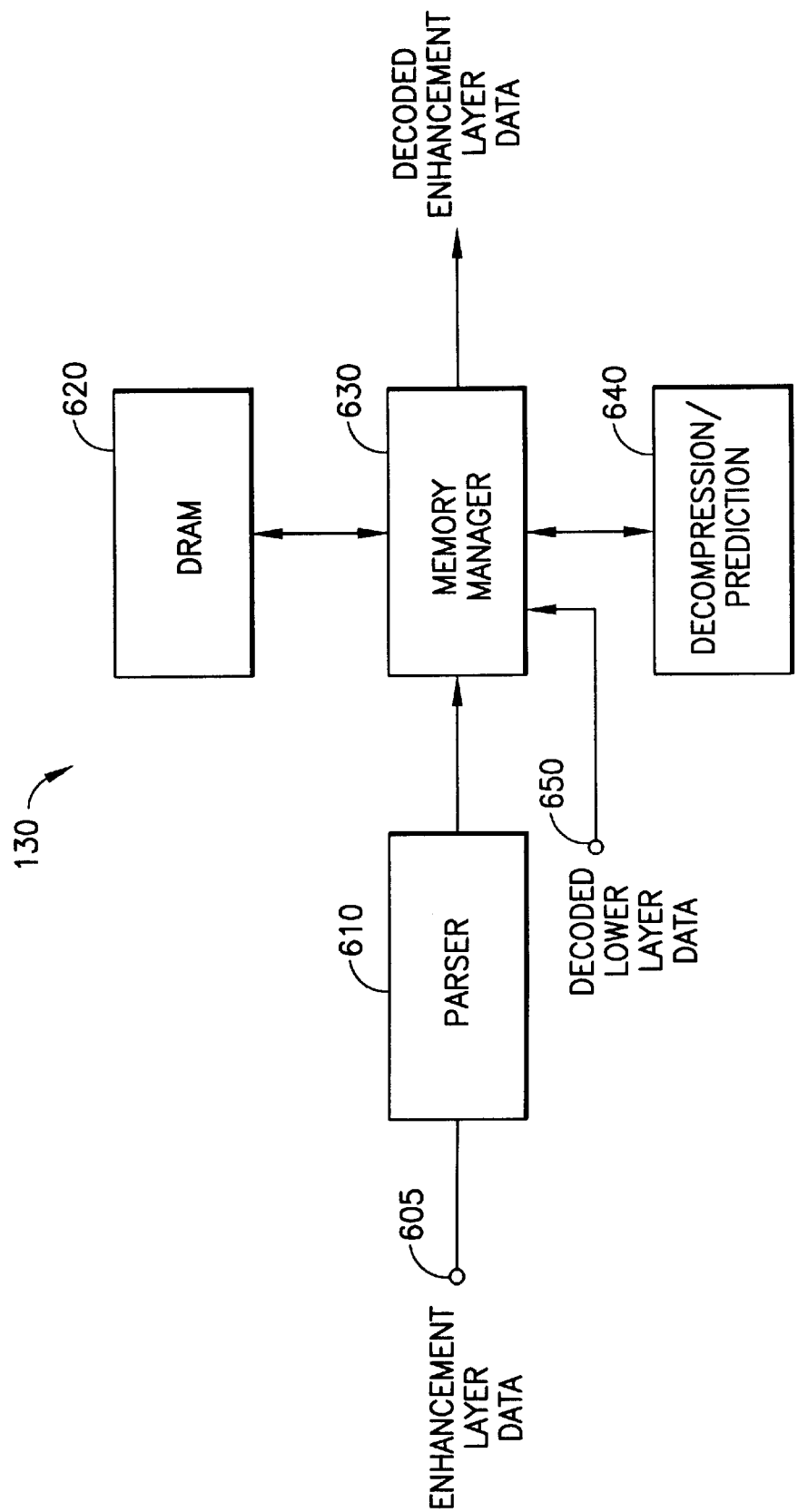

SYNCHRONIZATION OF A STEREOSCOPIC VIDEO SEQUENCE

BACKGROUND OF THE INVENTION

The present invention relates to an apparatus and method for synchronizing the decoding and display (e.g., presentation) of a stereoscopic video sequence. In particular, a system for determining a presentation time stamp and decoding time stamp of an enhancement layer is presented, in addition to a corresponding optimal bitstream transmission ordering which minimizes the required decoder input buffer size.

Digital technology has revolutionized the delivery of video and audio services to consumers since it can deliver signals of much higher quality than analog techniques and provide additional features that were previously unavailable. Digital systems are particularly advantageous for signals that are broadcast via a cable television network or by satellite to cable television affiliates and/or directly to home satellite television receivers. In such systems, a subscriber receives the digital data stream via a receiver/descrambler that decompresses and decodes the data in order to reconstruct the original video and audio signals. The digital receiver includes a microcomputer and memory storage elements for use in this process.

The need to provide low cost receivers while still providing high quality video and audio requires that the amount of data which is processed be limited. Moreover, the available bandwidth for the transmission of the digital signal may also be limited by physical constraints, existing communication protocols, and governmental regulations. Accordingly, various intra-frame data compression schemes have been developed that take advantage of the spatial correlation among adjacent pixels in a particular video picture (e.g., frame).

Moreover, inter-frame compression schemes take advantage of temporal correlations between corresponding regions of successive frames by using motion compensation data and block-matching motion estimation algorithms. In this case, a motion vector is determined for each block in a current picture of an image by identifying a block in a previous picture which most closely resembles the particular current block. The entire current picture can then be reconstructed at a decoder by sending data which represents the difference between the corresponding block pairs, together with the motion vectors that are required to identify the corresponding pairs. Block matching motion estimating algorithms are particularly effective when combined with block-based spatial compression techniques such as the discrete cosine transform (DCT).

Additionally, there has been increasing interest in proposed stereoscopic video transmission formats such as the Motion Picture Experts Group (MPEG) MPEG-2 Multi-view Profile (MVP) system, described in document ISO/IEC JTC1/SC29/WG11 N1088, entitled "Proposed Draft Amendment No. 3 to 13818-2 (Multi-view Profile)," November, 1995, incorporated herein by reference. Stereoscopic video provides slightly offset views of the same image to produce a combined image with greater depth of field, thereby creating a three-dimensional (3-D) effect. In such a system, dual cameras may be positioned about two inches apart to record an event on two separate video signals. The spacing of the cameras approximates the distance between left and right human eyes. Moreover, with some stereoscopic video camcorders, the two lenses are built into one camcorder head and therefore move in synchronism, for example, when panning across an image. The two video signals can be transmitted and recombined at a receiver to produce an image with a depth of field that corresponds to normal human vision. Other special effects can also be provided.

The MPEG MVP system includes two video layers which are transmitted in a multiplexed signal. First, a base (e.g., lower) layer represents a left view of a three dimensional object. Second, an enhancement (e.g., auxiliary, or upper) layer represents a right view of the object. Since the right and left views are of the same object and are offset only slightly relative to each other, there will usually be a large degree of correlation between the video images of the base and enhancement layers. This correlation can be used to compress the enhancement layer data relative to the base layer, thereby reducing the amount of data that needs to be transmitted in the enhancement layer to maintain a given image quality. The image quality generally corresponds to the quantization level of the video data.

The MPEG MVP system includes three types of video pictures; specifically, the intra-coded picture (I-picture), predictive-coded picture (P-picture), and bi-directionally predictive-coded picture (B-picture). Furthermore, while the base layer accommodates either frame or field structure video sequences, the enhancement layer accommodates only frame structure. An I-picture completely describes a single video picture without reference to any other picture. For improved error concealment, motion vectors can be included with an I-picture. An error in an I-picture has the potential for greater impact on the displayed video since both P-pictures and B-pictures in the base layer are predicted from I-pictures. Moreover, pictures in the enhancement layer can be predicted from pictures in the base layer in a cross-layer prediction process known as disparity prediction. Prediction from one frame to another within a layer is known as temporal prediction.

In the base layer, P pictures are predicted based on previous I or P pictures. The reference is from an earlier I or P picture to a future P-picture and is known as forward prediction. B-pictures are predicted from the closest earlier I or P picture and the closest later I or P picture.

In the enhancement layer, a P-picture can be predicted from (a) the most recently decoded picture in the enhancement layer, (b) the most recent base layer picture, in display order, or (c) the next lower layer picture, in display order. Case (b) is used usually when the most recent base layer picture, in display order, is an I-picture. Moreover, a B-picture in the enhancement layer can be predicted using (d) the most recent decoded enhancement layer picture for forward prediction, and the most recent lower layer picture, in display order, for backward prediction, (e) the most recent decoded enhancement layer picture for forward prediction, and the next lower layer picture, in display order, for backward prediction, or (f) the most recent lower layer picture, in display order, for forward prediction, and the next lower layer picture, in display order, for backward prediction. When the most recent lower layer picture, in display order, is an I-picture, only that I-picture will be used for predictive coding (e.g., there will be no forward prediction).

Note that only prediction modes (a), (b) and (d) are encompassed within the MPEG MVP system. The MVP system is a subset of MPEG temporal scalability coding, which encompasses each of modes (a)–(f).

In one optional configuration, the enhancement layer has only P and B pictures, but no I pictures. The reference to a future picture (i.e., one that has not yet been displayed) is called backward prediction. Note that no backward prediction occurs within the enhancement layer. Accordingly, enhancement layer pictures are transmitted in display order. There are situations where backward prediction is very useful in increasing the compression rate. For example, in a scene in which a door opens, the current picture may predict what is behind the door based upon a future picture in which the door is already open.

B-pictures yield the most compression but also incorporate the most error. To eliminate error propagation, B-pictures may never be predicted from other B-pictures in the base layer. P-pictures yield less error and less compression. I-pictures yield the least compression, but are able to provide random access.

Thus, in the base layer, to decode P pictures, the previous I-picture or P-picture must be available. Similarly, to decode B pictures, the previous P or I and future P or I pictures must be available. Consequently, the video pictures are encoded and transmitted in dependency order, such that all pictures used for prediction are coded before the pictures predicted therefrom. When the encoded signal is received at a decoder, the video pictures are decoded and re-ordered for display. Accordingly, temporary storage elements are required to buffer the data before display. However, the need for a relatively large decoder input buffer increases the cost of manufacturing the decoder. This is undesirable since the decoders are mass-marketed items that must be produced at the lowest possible cost.

Additionally, there is a need to synchronize the decoding and presentation of the enhancement and base layer video sequences. Synchronization of the decoding and presentation process for stereoscopic video is a particularly important aspect of MVP. Since it is inherent in stereoscopic video that two views are tightly coupled to one another, loss of presentation or display synchronization could cause many problems for the viewer, such as eye strain, headaches, and so forth.

Moreover, the problems in dealing with this issue for digital compressed bitstreams are different from those for uncompressed bitstreams or analog signals such as those conforming to the NTSC or PAL standards. For example, with NTSC or PAL signals, the pictures are transmitted in a synchronous manner, so that a clock signal can be derived directly from the picture synch. In this case, synchronization of two views can be achieved easily by using the picture synch.

However, in a digital compressed stereoscopic bitstream, the amount of data for each picture in each layer is variable, and depends on the bit rate, picture coding types and complexity of the scene. Thus, decoding and presentation timing can not be derived directly from the start of picture data. That is, unlike analog video transmissions, there is no natural concept of synch pulses in a digital compressed bitstream.

Accordingly, it would be advantageous to provide a system for synchronizing the decoding and presentation of a stereoscopic video sequence. The system should also be compatible with decoders that decode pictures either sequentially (e.g. one picture at a time) or in parallel (e.g., two pictures at time). Moreover, the system should provide an optimal picture transmission order that minimizes the required decoder input buffer size. The present invention provides a system having the above and other advantages.

SUMMARY OF THE INVENTION

In accordance with the present invention, a method and apparatus are presented for ordering the transmission sequence of video pictures of lower and enhancement layers of a stereoscopic video sequence. In particular, the pictures are transmitted in an order such that the number of pictures which must be temporarily stored prior to presentation is minimized. Furthermore, a decode time stamp (DTS) and presentation time stamp (PTS) for each picture can be determined to provide synchronization between the lower layer and enhancement layer pictures at the decoder where decoding occurs either sequentially or in parallel.

In particular, a method is presented for ordering the transmission of a sequence of video pictures in a lower layer and an enhancement layer of a stereoscopic video signal, where the enhancement layer includes disparity-predicted pictures which are predicted using corresponding lower layer pictures. The method includes the step of ordering the video pictures such that the disparity-predicted enhancement layer pictures are transmitted after the corresponding respective lower layer pictures.

In a first embodiment, the lower layer includes only intra-coded pictures (I-pictures), including consecutive pictures $I_{Li}$, $I_{Li+1}$, $I_{Li+2}$, $I_{Li+3}$, $I_{Li+4}$ and so on, and corresponding enhancement layer pictures are represented by $H_{Ei}$, $H_{Ei+1}$, $H_{Ei+2}$, $H_{Ei+3}$, $H_{Ei+4}$, and so on. In this case, the video pictures are transmitted in the order: $I_{Li}$, $I_{Li+1}$, $H_{Ei}$, $I_{Li+2}$, $H_{Ei+1}$, $I_{Li+3}$, $H_{Ei+2}$, $I_{Li+4}$, $H_{Ei+3}$, and so on (e.g., sequence 1).

Alternatively, in a second embodiment, the video pictures are transmitted in the order: $I_{Li}$, $H_{Ei}$, $I_{Li+1}$, $H_{Ei+1}$, $I_{Li+2}$, $H_{Ei+2}$, $I_{Li+3}$, $H_{Ei+3}$, and so on (e.g., sequence 2).

In a third embodiment, the lower layer includes only intra-coded pictures (I-pictures) and predictive-coded pictures (P-pictures), including consecutive pictures $I_{Li}$, $P_{Li+1}$, $P_{Li+2}$, $P_{Li+3}$ and $P_{Li+4}$, and so on, and corresponding enhancement layer pictures are represented by $H_{Ei}$, $H_{Ei+1}$, $H_{Ei+2}$, $H_{Ei+3}$ and $H_{Ei+4}$, and so on, respectively. Here, the video pictures are transmitted in the order: $I_{Li}$, $P_{Li+1}$, $H_{Ei}$, $P_{Li+2}$, $H_{Ei+1}$, $P_{Li+3}$, $H_{Ei+2}$, $P_{Li+4}$, $H_{Ei+3}$ and so on (e.g., sequence 3).

Alternatively, in a fourth embodiment, the video pictures are transmitted in the order: $I_{Li}$, $H_{Ei}$, $P_{Li+1}$, $H_{Ei+1}$, $I_{Li+2}$, $H_{Ei+2}$, $P_{Li+3}$, $H_{Ei+3}$ and so on (e.g., sequence 4).

In a fifth embodiment, the lower layer includes intra-coded pictures (I-pictures), predictive-coded pictures (P-pictures), and non-consecutive bi-directional predictive-coded pictures (B-pictures), including consecutive pictures $I_{Li}$, $B_{Li+1}$, $P_{Li+2}$, $B_{Li+3}$, $P_{Li+4}$, $B_{Li+5}$, $P_{Li+6}$ and so on, respectively, and corresponding enhancement layer pictures are represented by $H_{Ei}$, $H_{Ei+1}$, $H_{Ei+2}$, $H_{Ei+3}$, $H_{Ei+4}$, $H_{Ei+5}$, $H_{Ei+6}$ and so on, respectively. The video pictures are transmitted in the order: $I_{Li}$, $P_{Li+2}$, $B_{Li+1}$, $H_{Ei}$, $H_{Ei+1}$, $P_{Li+4}$, $B_{Li+3}$, $H_{Ei+2}$, $H_{Ei+3}$ and so on (e.g., sequence 5).

Alternatively, in a sixth embodiment, the video pictures are transmitted in the order: $I_{Li}$, $H_{Ei}$, $P_{Li+2}$, $B_{Li+1}$, $H_{Ei+1}$, $H_{Ei+2}$, $P_{Li+4}$, $B_{Li+3}$, $H_{Ei+3}$, $H_{Ei+4}$ and so on (e.g., sequence 6).

Alternatively, in a seventh embodiment, the video pictures are transmitted in the order: $I_{Li}$, $P_{Li+2}$, $H_{Ei}$, $B_{Li+1}$, $H_{Ei+1}$, $P_{Li+4}$, $H_{Ei+2}$, $B_{Li+3}$, $H_{Ei+3}$ and so on (e.g., sequence 7).

In an eighth embodiment, the lower layer includes intra-coded pictures (I-pictures), predictive-coded pictures (P-pictures), and consecutive bi-directional predictive-coded pictures (B-pictures), including consecutive pictures $I_{Li}$, $B_{Li+1}$, $B_{Li+2}$, $P_{Li+3}$, $B_{Li+4}$, $B_{Li+5}$, $P_{Li+6}$ and so on, respectively, and corresponding enhancement layer pictures are represented by $H_{Ei}$, $H_{Ei+1}$, $H_{Ei+2}$, $H_{Ei+3}$, $H_{Ei+4}$, $H_{Ei+5}$, and $H_{Ei+6}$ and so on, respectively. The video pictures are transmitted in the order: $I_{Li}$, $P_{Li+3}$, $B_{Li+1}$, $H_{Ei}$, $B_{Li+2}$, $H_{Ei+1}$, $H_{Ei+2}$, $P_{Li+6}$, $B_{Li+4}$, $H_{Ei+3}$, $B_{Li+5}$, $H_{Ei+4}$, $H_{Ei+5}$ and so on (e.g., sequence 8).

Alternatively, in a ninth embodiment, the video pictures are transmitted in the order: $I_{Li}$, $H_{Ei}$, $P_{Li+3}$, $B_{Li+1}$, $H_{Ei+1}$, $B_{Li+2}$, $H_{Ei+2}$, $H_{Ei+3}$, $P_{Li+6}$, $B_{Li+4}$, $H_{Ei+4}$, $B_{Li+5}$, $H_{Ei+5}$ and $H_{Ei+6}$ and so on (e.g., sequence 9).

Alternatively, in a tenth embodiment, the video pictures are transmitted in the order: $I_{Li}$, $P_{Li+3}$, $H_{Ei}$, $B_{Li+1}$, $H_{Ei+1}$, $B_{Li+2}$, $H_{Ei+2}$, $P_{Li+6}$, $H_{Ei+3}$, $B_{Li+4}$, $H_{Ei+4}$, $B_{Li+5}$, $H_{Ei+5}$ and so on (e.g., sequence 10).

A corresponding apparatus is also presented.

Additionally, a receiver is presented for processing a sequence of video pictures of a stereoscopic signal including a lower layer and an enhancement layer. The receiver includes a memory, a decompression/prediction processor, and a memory manager operatively associated with the memory and the processor. The memory manager schedules the storage of selected lower layer pictures in the memory such that they are processed by the decompression/prediction processor prior to corresponding ones of the disparity-predicted enhancement layer pictures. Moreover, decoding may occur sequentially or in parallel.

BRIEF DESCRIPTION OF THE DRAWINGS

FIG. 6 is a block diagram of an enhancement layer decoder structure for stereoscopic video.

DETAILED DESCRIPTION OF THE INVENTION

A method and apparatus are presented for synchronizing the decoding and presentation of a stereoscopic video picture sequence.

Figure 1:
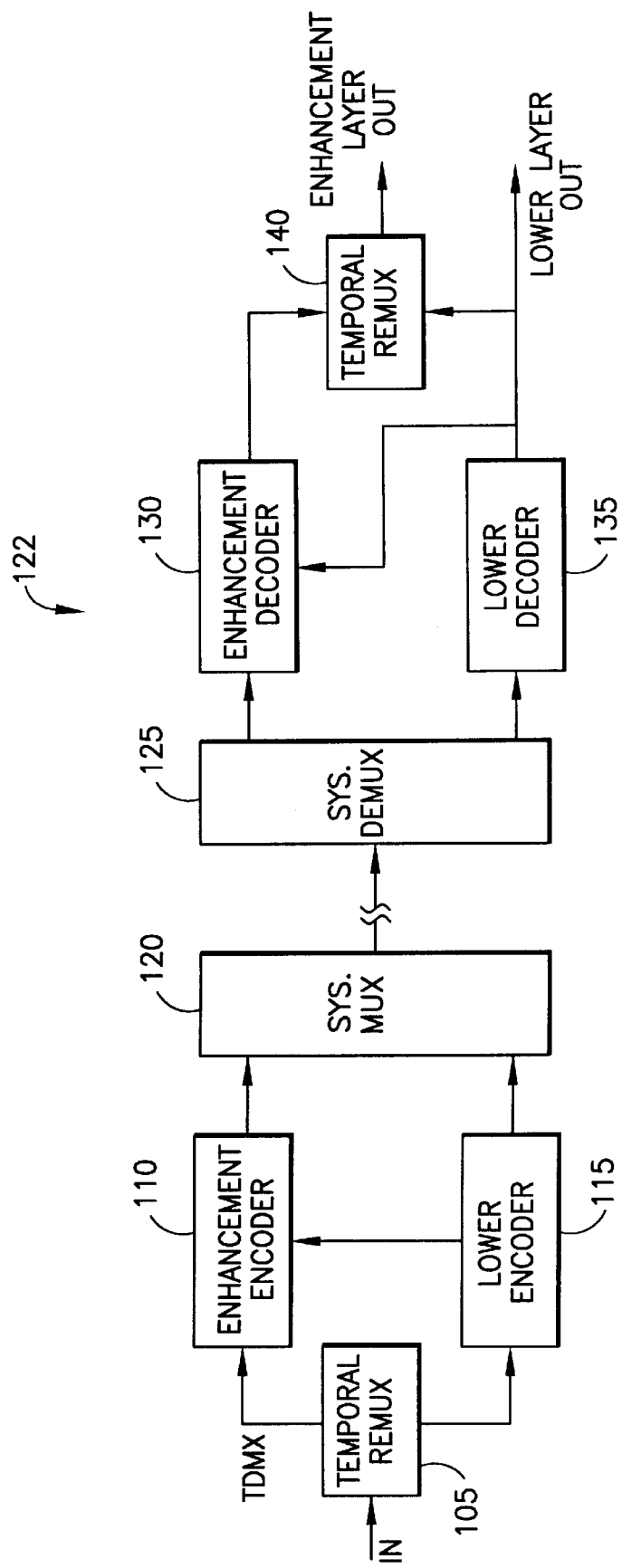
FIG. 1 is a block diagram of a coder/decoder structure for stereoscopic video.

FIG. 1 is a block diagram of a coder/decoder structure for stereoscopic video. The MPEG MVP standard and similar systems involve coding of two video layers, including a lower layer and an enhancement layer. For such an application, the lower layer is assigned to a left view while the enhancement layer is assigned to a right view. In the coder/decoder (e.g., codec) structure of FIG. 1, the lower layer and enhancement layer video sequences are received by a temporal remultiplexer (remux) 105. Using time division multiplexing (TDMX), the enhancement layer video is provided to an enhancement encoder 110, while the base layer video is provided to a lower encoder 115. Note that the lower layer video data may be provided to the enhancement encoder 110 for disparity prediction.

The encoded enhancement and base layers are then provided to a system multiplexer 120 for transmission to a decoder, shown generally at 122, as a transport stream. The transmission path is typically a satellite link to a cable system headend or directly via satellite to a consumer's home. At the decoder 122, the transport stream is demultiplexed at a system demultiplexer 125. The encoded enhancement layer data is provided to an enhancement decoder 130, while the encoded lower layer data is provided to a lower decoder 135. Note that decoding is preferably carried out concurrently with the lower and enhancement layers in a parallel processing configuration. Alternatively, the enhancement decoder 130 and lower decoder 135 may share common processing hardware, in which case decoding may be carried out sequentially, one picture at a time.

The decoded lower layer data is output from the lower decoder 135 as a separate data stream, and is also provided to a temporal remultiplexer 140. At the temporal remultiplexer 140, the decoded base layer data and the decoded enhancement layer data are combined to provide an enhancement layer output signal as shown. The enhancement and lower layer output signals are then provided to a display device for viewing.

Moreover, the coded bitstreams for both the lower and enhancement layers must be multiplexed at the system multiplexer 120 in such a way that the decoder 122 is able to decode any frame or field depending only on the frame or fields which have already been decoded. However, this problem is complicated by the fact that the prediction modes for P- and B-pictures are different in the lower and enhancement layers. Furthermore, the enhancement layer pictures are always transmitted in presentation (e.g., display) order, while this is often not the case for the lower layer. Therefore, there is often a need to store and reorder video pictures at the decoder so that decoding and display can occur in the proper order.

Additionally, difficulties arise in synchronizing the decoding and presentation of the lower and enhancement layer data. As mentioned, the video bitstreams for lower layer and enhancement layer are transmitted as two elementary video streams. For the transport stream, two packet identifiers (PIDs) of transport stream packets are specified in a transport stream program map section for the two layers. Furthermore, timing information is carried in the adaptation field of selected packets for the lower layer (e.g., in the PCR_PID field) to serve as a reference for timing comparisons at the decoder. Specifically, samples of a 27 MHz clock are transmitted in the program_clock_reference (PCR) field. More precisely, the samples are transmitted in the program_clock_reference_base and program_clock_reference_ extension field described in MPEG-2 system document ITU-T Rec. H.262, ISO/IEC 13818-1, Apr. 27, 1995, incorporated herein by reference. Further details of the MPEG-2 standard can be found in document ISO/IEC JTC1/SC29/WG11 N0702, entitled "Information Technology—Generic Coding of Moving Pictures and Associated Audio, Recommendation H.262," Mar. 25, 1994, incorporated herein by reference.

The PCR indicates the expected time at the completion of the reading of a field from the bitstream at the decoder. The phase of the local clock running at the decoder is compared to the PCR value in the bitstream at the moment at which the PCR value is obtained to determine whether the decoding of the video, audio, and other data is synchronized. Moreover, sample clocks in the decoder are locked to the system clock derived from the PCR values. The PCR values are computed by using equations described in ITU-T Rec. H.262, ISO/IEC 13818-1, and set forth below:

$$PCR(i)=PCR\_base(i) \times 300 + PCR\_ext(i),$$

where:

$$PCR\_base(i)=((system\_clock\_frequency \times t(i)) \text{ DIV } 300)\%2^{33}, \text{ and}$$

PCR_ext(i)=((system_clock_frequency×t(i))DIV 1)%300;

where the "%" symbol indicates a modulo operation.

In a similar manner, for the program stream of a stereoscopic video signal, timing information is carried in the packet header as a sample of the 27 MHz clock in the system_clock_reference (SCR) field. The SCR values are calculated by using equations described in ITU-T Rec. H.262, ISO/IEC 13818-1, and set forth below:

SCR(i)=SCR_base(i)×300+SCR_ext(i), where:

SCR_base(i)=((system_clock_frequency×t(i))DIV 300)%$2^{33}$, and

SCR_ext(i)=((system_clock_frequency×t(i))DIV 1)%300.

The identification of the video packets in both the lower and enhancement layers is specified in a program stream map as two stream identifiers. For both the transport stream and the program stream, synchronization of the decoding and presentation process for stereoscopic video is provided in packetized elementary stream (PES) packets. In particular, a presentation time stamp (PTS) and/or a decoding time stamp (DTS) are provided in the optional fields of the PES headers.

PES packets are built for each elementary video stream prior to transport or program packetization. A new PES packet is provided in the PES stream if it is necessary to send a PTS and/or DTS to the decoder. Therefore, one key factor for synchronization is to correctly calculate the PTS and DTS. The PTS and DTS are determined by the encoder based on hypothetical decoder models, namely, the transport stream system target decoder (T-STD), or the program stream system target decoder (P-STD), both of which are described in ITU-T Rec. H.262, ISO/IEC 13818-1.

Both PTS and DTS values are specified in units of the period of the system clock frequency divided by 300, which yields units of 90 KHz. In particular, as described in ITU-T Rec. H.262, ISO/IEC 13818-1:

PTS(k)=((system_clock_frequency×tp$_n$(k))DIV 300)%$2^{33}$, where tp$_n$(k) is the presentation time of presentation unit P$_n$(k). Similarly, DTS(j)=((system_clock_frequency×td$_n$(k)DIV 300)%$2^{33}$, where td$_n$(k) is the decoding time of access unit A$_n$(j). The video DTS thus indicates the time when the picture needs to be decoded by the STD. The video PTS indicates the time when the decoded picture is to be presented to the viewer (e.g., displayed on a television). Moreover, times indicated by the PTS and DTS are evaluated with respect to the current PCR or SCR value.

A video bitstream is decoded instantaneously in the theoretical STD model. However, if B-pictures are present in the lower layer of the stereoscopic bitstream, the bitstream will not arrive at the decoder in presentation (e.g., display) order. In such a case, some I- and/or P-pictures must be temporarily stored in a reorder buffer in the STD after being decoded until the appropriate presentation time. However, with the enhancement layer, all pictures arrive in presentation order at the decoder, and consequently the PTS and DTS values should be identical or be offset only by a fixed interval.

In order to synchronize the lower and enhancement layer sequences, corresponding pictures in the lower and enhancement layers must have the same PTS. Any existing methods of calculating the DTS for the MPEG-2 main profile can be employed for computation of the DTS in the lower layer, e.g., DTS$_L$, where "L" denotes the lower layer. Subsequent PTS and DTS values will reference to the corresponding DTS$_L$. In particular, let DTS$_{Li}$ and PTS$_{Li}$ denote the DTS and PTS, respectively, for the ith picture in the lower layer. Also, let DTS$_{Ei}$ and PTS$_{Ei}$ denote the DTS and PTS, respectively, for the ith picture in the enhancement layer. Then, the time interval, F, between the presentation of successive pictures can be defined as:

$$F = \frac{90 \times 10^3}{\text{frame rate}}.$$

For example, under the NTSC standard, with a frame rate of 29.97 frames/second, F=3,003. F is the nominal frame period in 90 KHz clock cycles, and corresponds to an actual elapsed time of 3,003 cycles/90 KHz=0.03336 seconds. Under the PAL standard, with a frame rate of 25 frames/second, F=3,600.

Moreover, synchronization of the lower and enhancement layer sequences is intimately dependent upon the transmission and display order of the video sequences. Generally, the MPEG-2 standard for non-stereoscopic video signals does not specify any particular distribution that I-pictures, P-pictures and B-pictures must take within a sequence in the base layer, but allows different distributions to provide different degrees of compression and random accessibility. In one possible distribution, each picture in the base layer is an I-picture. In other possible distributions, both I- and P-pictures are provided, or both I-, P-, and B-pictures, where the B-pictures are provided non-consecutively, or both I-, P-, and B-pictures, where two consecutive B-pictures may be provided. Generally, three or more consecutive B-pictures are not used due to a degraded image quality. In the enhancement layer, B- and P-pictures are provided, and I-pictures may optionally be provided.

Figure 2:
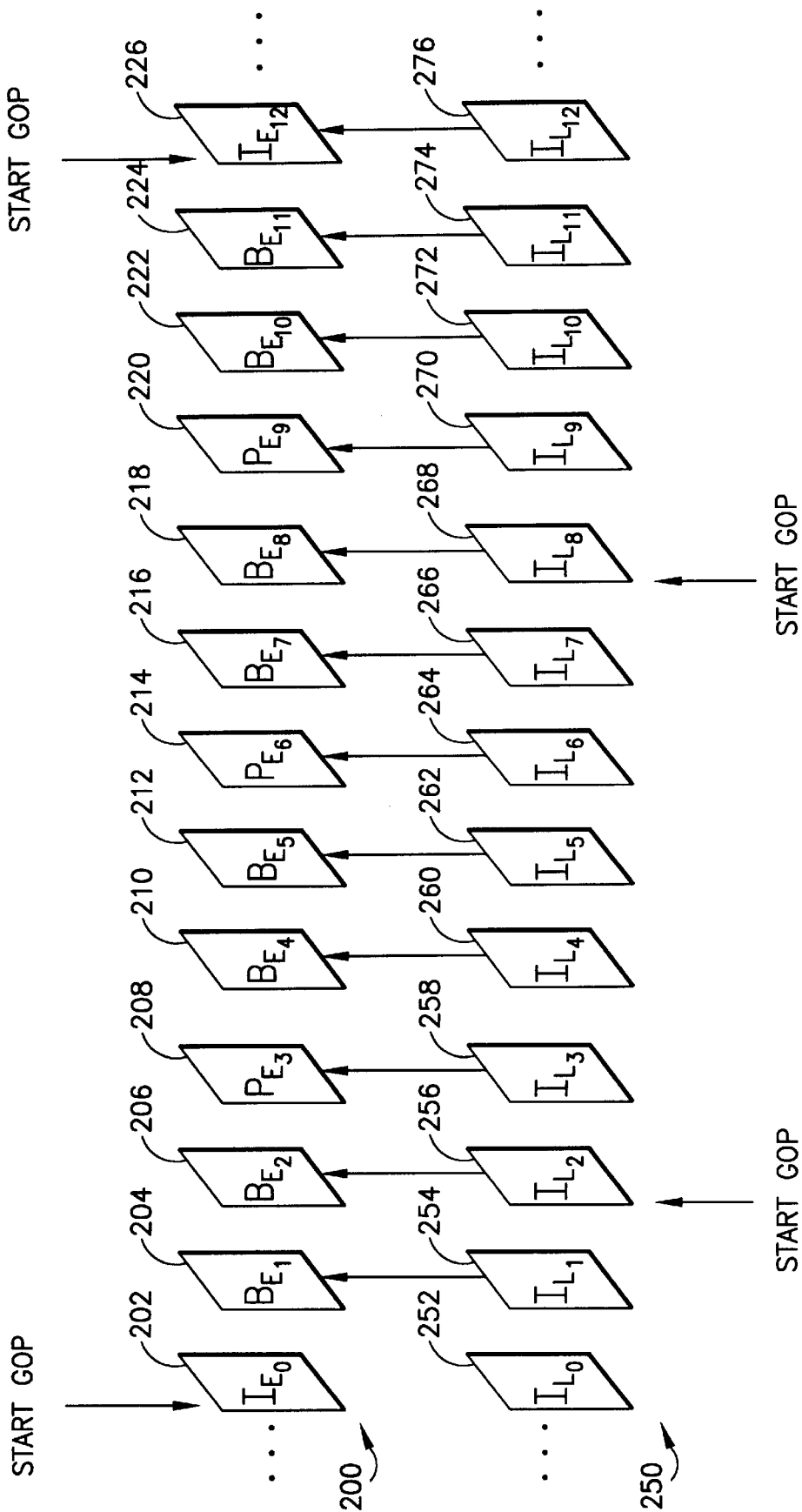
FIG. 2 is an illustration of an enhancement layer picture sequence and a first base layer picture sequence for use with the system of the present invention.

FIG. 2 is an illustration of an enhancement layer picture sequence and a first base layer picture sequence for use with the system of the present invention. Here, the lower layer includes only I-pictures. The enhancement layer picture sequence is shown generally at 200, while the lower layer sequence is shown generally at 250. The sequences 200 and 250 are shown in display order. Each picture is labeled to indicate the picture type (e.g., I, B, or P), the layer designation (e.g., "E" for the enhancement layer, and L" for the lower layer), and the sequential positioning of the picture, where the subscript "0" indicates the zeroeth picture in the sequence, the subscript "1" indicates the first picture in the sequence, and so on.

The enhancement layer 200 includes pictures I$_{E0}$ (202), B$_{E1}$ (204), B$_{E2}$ (206), P$_{E3}$ (208), B$_{E4}$ (210), B$_{E5}$ (212), P$_{E6}$ (214), B$_{E7}$ (216), B$_{E8}$ (218), P$_{E9}$ (220), B$_{E10}$ (222), B$_{E11}$ (224) and I$_{E12}$ (226). However, the particular enhancement layer sequence shown is illustrative only. In any of the enhancement layer sequences discussed herein, including those of FIGS. 2–5, the particular enhancement layer picture type is not limiting since the enhancement layer is transmitted in display order. Thus, any of the enhancement layer pictures can be considered to be a generic picture type (e.g., H$_{Ei}$), where "H" denotes the picture type.

The lower layer 250 in this example includes only I-pictures, including I$_{L0}$ (252), I$_{L1}$ (254), I$_{L2}$ (256), I$_{L3}$ (258), I$_{L4}$ (260), I$_{L5}$ (262), I$_{L6}$ (264), I$_{L7}$ (266), I$_{L8}$ (268), I$_{L9}$ (270), I$_{L10}$ (272), I$_{L11}$ (274) and I$_{L12}$ (276). Additionally, the start of the group of pictures (GOP) for each of the sequences is indicated. The GOP indicates one or more consecutive pictures which can be decoded without reference to pictures in another GOP. Generally, the GOPs of the lower and enhancement layers are not aligned, and have different lengths. For example, the start of a first GOP in the enhancement layer 200 is shown at picture $I_{E0}$ (202), while the start of a second GOP is at picture $I_{E12}$ (226). Similarly, the start of a first GOP in the lower layer 250 is shown at picture $I_{L2}$ (256), while the start of a second GOP is at picture $I_{L8}$ (268).

Furthermore, the arrows shown in FIG. 2 indicate the allowed prediction modes such that the picture which is pointed to by an arrow head can be predicted based on the picture which is connected to the tail of the arrow. For example, picture $B_{E1}$ (204) is predicted from picture $I_{L1}$ (254). Recall that the I-pictures are not predictive-coded, but are self-contained.

With the picture display order of FIG. 2, an advantageous transmission sequence in accordance with the present invention, starting at $I_{L2}$, is: $I_{L2}$, $B_{E1}$, $I_{L3}$, $B_{E2}$, $I_{L4}$, $P_{E3}$, $I_{L5}$, $B_{E4}$, $I_{L6}$, $B_{E5}$, $I_{L7}$, $P_{E6}$, $I_{L8}$, $B_{E7}$, $I_{L9}$, $B_{E8}$, $I_{L10}$, $P_{E9}$, $I_{L11}$, $B_{E10}$, $I_{L12}$, $B_{E11}$, and so on (sequence 1). With this picture ordering, each predictive-coded picture which arrives at the decoder will not have to be reordered before decoding. Thus, the storage and processing requirements at the decoder can be reduced, thereby reducing the cost of the decoder. Another suitable picture transmission sequence is: $I_{L2}$, $B_{E2}$, $I_{L3}$, $P_{E3}$, $I_{L4}$, $B_{E4}$, $I_{L5}$, $B_{E5}$, $I_{L6}$, $P_{E6}$, $I_{L7}$, $B_{E7}$, $I_{L8}$, $B_{E8}$, $I_{L9}$, $P_{E9}$, $I_{L10}$, $B_{E10}$, $I_{L11}$, $B_{E11}$, $I_{L12}$, $I_{E12}$ and so on (sequence 2).

With these picture transmission sequences, all pictures arrive at the decoder in presentation order. Furthermore, it is possible to determine the appropriate PTS and DTS for each picture. First, assume the DTS of the ith lower layer picture, $DTS_{Li}$, is known.

As a specific example, with the first picture transmission sequence of FIG. 2, i.e., sequence 1, the decoding and presenting occurs as described in Table 1 below. Serial decoding is assumed. In Table 1, the first column indicates the time, using $DTS_{L2}$ as the start time, with increments of 0.5F, the second column indicates the decoding time of the lower layer picture, the third column indicates the decoding time of the enhancement layer pictures, and the fourth column indicates the presentation time of the lower and enhancement layer pictures.

TABLE 1

| Time, +$DTS_{L2}$ | Decode | Decode | Present | Present |
|---|---|---|---|---|
| 0 | $I_{L2}$ | | | |
| 0.5F | | $B_{E1}$ | $I_{L1}$ | $B_{E1}$ |
| F | $I_{L3}$ | | | |
| 1.5F | | $B_{E2}$ | $I_{L2}$ | $B_{E2}$ |
| 2F | $I_{L4}$ | | | |
| 2.5F | | $P_{E3}$ | $I_{L3}$ | $P_{E3}$ |
| 3F | $I_{L5}$ | | | |
| 3.5F | | $B_{E4}$ | $I_{L4}$ | $B_{E4}$ |
| 4F | $I_{L6}$ | | | |
| 4.5F | | $B_{E5}$ | $I_{L5}$ | $B_{E5}$ |
| 5F | $I_{L7}$ | | | |
| 5.5F | | $P_{E6}$ | $I_{L6}$ | $P_{E6}$ |
| 6F | $I_{L8}$ | | | |
| 6.5F | | $B_{E7}$ | $I_{L7}$ | $B_{E7}$ |
| 7F | $IL_9$ | | | |
| 7.5F | | $B_{E8}$ | $I_{L8}$ | $B_{E8}$ |
| 8F | $I_{L10}$ | | | |
| 8.5F | | $P_{E9}$ | $I_{L9}$ | $P_{E9}$ |
| 9F | $I_{L11}$ | | | |
| 9.5F | | $B_{E10}$ | $I_{L10}$ | $B_{E10}$ |
| 10F | $I_{L12}$ | | | |
| 10.5F | | $B_{E11}$ | $I_{L11}$ | $B_{E11}$ |

Here, storage for only two decoded pictures is required. For instance, $I_{L2}$ and $I_{L3}$ are decoded and stored prior to $B_{E2}$ being received. When received, $B_{E2}$ can then be immediately decoded and output for presentation substantially concurrently with $I_{L2}$.

Furthermore, for the ith picture in either the lower or enhancement sequences, the DTS and PTS can be determined from $DTS_{Li}$ as follows:
$PTS_{Li}=DTS_{Li}+1.5F$;
$DTS_{Ei}=DTS_{Li}+1.5F$; and
$PTS_{Ei}=PTS_{Li}$.

For example, the PTS for $P_{E3}$ (208) in FIG. 2 is equal to the sum of 1.5F and the DTS for $I_{L3}$. Thus, the decoding and presentation of $P_{E3}$ will follow the decoding of $I_{L3}$ by 1.5 picture time intervals (i.e., 1.5F).

With the second picture transmission sequence of FIG. 2, the decoding and presenting occurs as described in Table 2 below.

TABLE 2

| Time, +$DTS_{L2}$ | Decode | Decode | Present | Present |
|---|---|---|---|---|
| 0 | $I_{L2}$ | | | |
| 0.5F | | $B_{E2}$ | $I_{L2}$ | $B_{E2}$ |
| F | $I_{L3}$ | | | |
| 1.5F | | $P_{E3}$ | $I_{L3}$ | $P_{E3}$ |
| 2F | $I_{L4}$ | | | |
| 2.5F | | $B_{E4}$ | $I_{L4}$ | $B_{E4}$ |
| 3F | $I_{L5}$ | | | |
| 3.5F | | $B_{E5}$ | $I_{L5}$ | $B_{E5}$ |
| 4F | $I_{L6}$ | | | |
| 4.5F | | $P_{E6}$ | $I_{L6}$ | $P_{E6}$ |
| 5F | $I_{L7}$ | | | |
| 5.5F | | $B_{E7}$ | $I_{L7}$ | $B_{E7}$ |
| 6F | $I_{L8}$ | | | |
| 6.5F | | $B_{E8}$ | $I_{L8}$ | $B_{E8}$ |
| 7F | $I_{L9}$ | | | |
| 7.5F | | $P_{E9}$ | $I_{L9}$ | $P_{E9}$ |
| 8F | $I_{L10}$ | | | |
| 8.5F | | $B_{E10}$ | $I_{L10}$ | $B_{E10}$ |
| 9F | $I_{L11}$ | | | |
| 9.5F | | $B_{E11}$ | $I_{L11}$ | $B_{E11}$ |
| 10F | $I_{L12}$ | | | |
| 10.5F | | $I_{E12}$ | $I_{L12}$ | $I_{E12}$ |

Here, storage for only one decoded picture is required. For instance, $I_{L2}$ is decoded and stored prior to $B_{E2}$ being received. When received, $B_{E2}$ can then be immediately decoded and output for presentation concurrently with $I_{L2}$.

For the ith picture in either the lower or enhancement sequences, the DTS and PTS can be determined from $DTS_{Li}$ as follows for the transmission sequence of Table 2:
$PTS_{Li}=DTS_{Li}+0.5F$;
$DTS_{Ei}=DTS_{Li}+0.5F$; and
$PTS_{Ei}=PTS_{Li}$.

Figure 3:
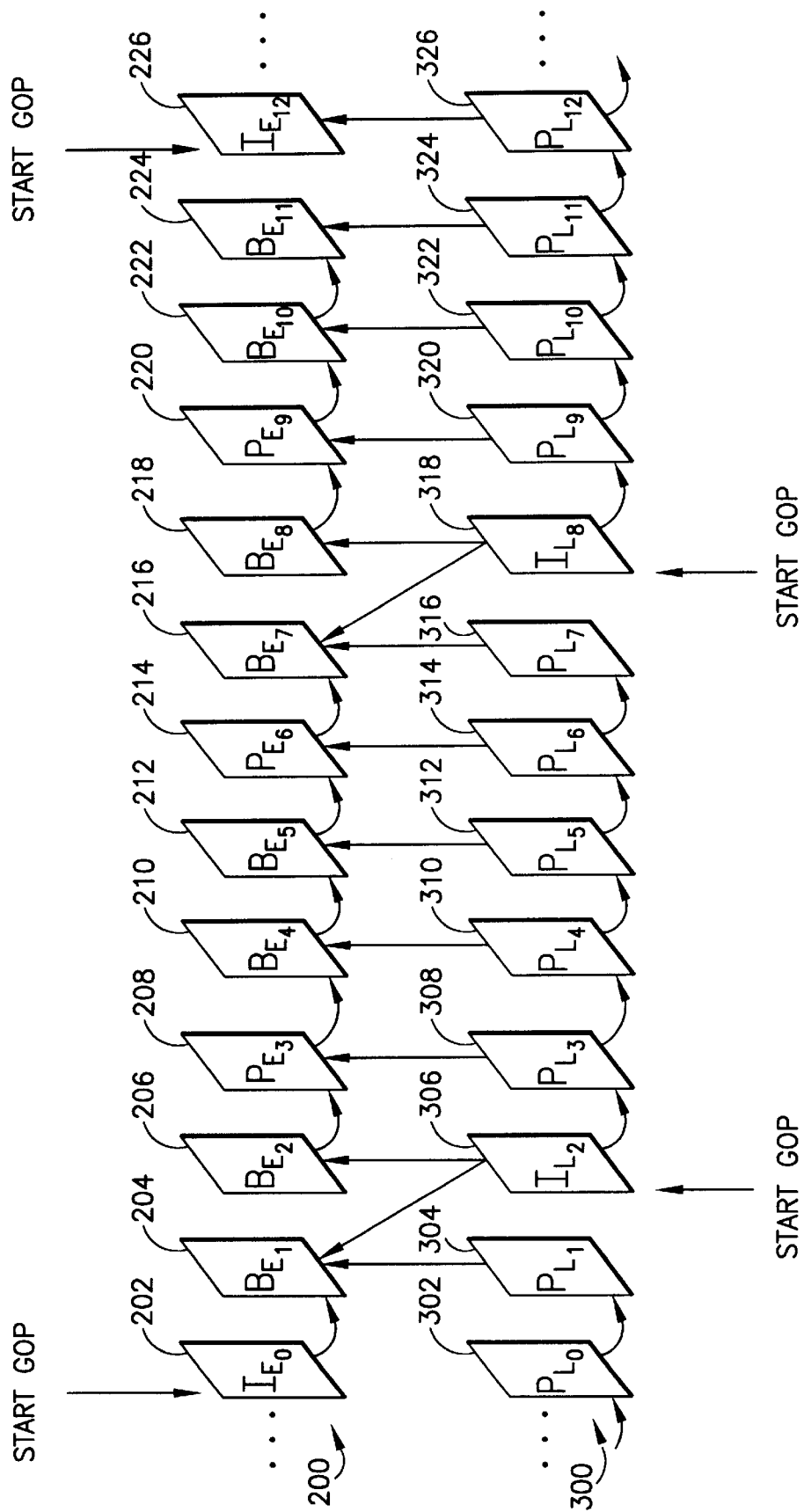
FIG. 3 is an illustration of an enhancement layer picture sequence and a second base layer picture sequence for use with the system of the present invention.

FIG. 3 is an illustration of an enhancement layer picture sequence and a second base layer picture sequence for use with the system of the present invention. Here, the lower layer includes both I- and P-pictures. Like-numbered elements correspond to the elements of FIG. 2. The enhancement layer 200 is the same as previously discussed. The lower layer, shown generally at 300, includes the picture sequence $P_{L0}$ (302), $P_{L1}$ (304), $I_{L2}$ (306), $P_{L3}$ (308), $P_{L4}$ (310), $P_{L5}$ (312), $P_{L6}$ (314), $I_{L8}$ (316), $P_{L9}$ (318), $P_{L10}$ (320), $P_{L11}$ (322) and $P_{L12}$ (326). GOPs start at $I_{L2}$ (306) and $I_{L8}$ (318).

Here, the prediction scheme is somewhat more complex. Recall that, in the base layer, a P-picture is predictive-coded using the closest previous I- or P-picture. In the enhancement layer, a B-picture can be predictive-coded using up to three possible different modes. However, when the corresponding lower layer picture is an I-picture, only that I-picture is used. Also, in the enhancement layer, a P-picture is predictive-coded using the most recent enhancement layer picture, the most recent lower layer picture, in display order, or the next lower layer picture, in display order. Again, when the corresponding lower layer picture is an I-picture, only that I-picture is used. Note that, in some cases, the prediction modes shown include optional paths.

Thus, in the lower layer sequence 300, for example, $P_{L4}$ is coded using $P_{L3}$ and $P_{L5}$. In the enhancement layer 200, $P_{E3}$ may be coded using $B_{E2}$ or $P_{L3}$. A suitable picture transmission sequence in accordance with the present invention, beginning at $I_{L2}$, is: $I_{L2}$, $B_{E1}$, $P_{L3}$, $B_{E2}$, $P_{L4}$, $P_{E3}$, $P_{L5}$, $B_{E4}$, $P_{L6}$, $B_{E5}$, $P_{L7}$, $P_{E6}$, $I_{L8}$, $B_{E7}$, $P_{L9}$, $B_{E8}$, $P_{L10}$, $P_{E9}$, $P_{L11}$, $B_{E10}$, $P_{L12}$, $B_{E11}$, and so on (sequence 3). For this sequence, the decoding and presenting occurs as described in Table 3 below.

TABLE 3

| Time, +DTS$_{L2}$ | Decode | Decode | Present | Present |
|---|---|---|---|---|
| 0 | $I_{L2}$ | | | |
| 0.5F | | $B_{E1}$ | | |
| F | $P_{L3}$ | | | |
| 1.5F | | $B_{E2}$ | $I_{L2}$ | $B_{E2}$ |
| 2F | $P_{L4}$ | | | |
| 2.5F | | $P_{E3}$ | $P_{L3}$ | $P_{E3}$ |
| 3F | $P_{L5}$ | | | |
| 3.5F | | $B_{E4}$ | $P_{L4}$ | $B_{E4}$ |
| 4F | $P_{L6}$ | | | |
| 4.5F | | $B_{E5}$ | $P_{L5}$ | $B_{E5}$ |
| 5F | $P_{L7}$ | | | |
| 5.5F | | $P_{E6}$ | $P_{L6}$ | $P_{E6}$ |
| 6F | $I_{L8}$ | | | |
| 6.5F | | $B_{E7}$ | $P_{L7}$ | $B_{E7}$ |
| 7F | $P_{L9}$ | | | |
| 7.5F | | $B_{E8}$ | $I_{L8}$ | $B_{E8}$ |
| 8F | $P_{L10}$ | | | |
| 8.5F | | $P_{E9}$ | $P_{L9}$ | $P_{E9}$ |
| 9F | $P_{L11}$ | | | |
| 9.5F | | $B_{E10}$ | $P_{L10}$ | $B_{E10}$ |
| 10F | $P_{L12}$ | | | |
| 10.5F | | $B_{E11}$ | $P_{L11}$ | $B_{E11}$ |

Here, storage for only two decoded pictures is required. For instance, $I_{L2}$ and $P_{L3}$ are decoded and stored prior to $B_{E2}$ being received. When received, $B_{E2}$ can then be immediately decoded and output for presentation concurrently with $I_{L2}$.

For the ith picture in either the lower or enhancement sequences, the DTS and PTS can be determined from DTS$_{Li}$ as follows for the transmission sequence of Table 3:

$PTS_{Li} = DTS_{Li} + 0.5F$;

$DTS_{Ei} = DTS_{Li} + 1.5F$; and $PTS_{Ei} = PTS_{Li}$.

Alternatively, another suitable transmission sequence for the example of FIG. 3 is: $I_{L2}$, $B_{E2}$, $P_{L3}$, $P_{E3}$, $P_{L4}$, $B_{E4}$, $P_{L5}$, $B_{E5}$, $P_{L6}$, $P_{E6}$, $P_{L7}$, $B_{E7}$, $I_{L8}$, $B_{E8}$, $P_{L9}$, $P_{E9}$, $P_{L10}$, $B_{E10}$, $P_{L11}$, $B_{E11}$, $P_{L12}$, $I_{E12}$, and so on (sequence 4). The decoding and presenting occurs as described in Table 4 below.

TABLE 4

| Time, +DTS$_{L2}$ | Decode | Decode | Present | Present |
|---|---|---|---|---|
| 0 | $I_{L2}$ | | | |
| 0.5F | | $B_{E2}$ | $I_{L2}$ | $B_{E2}$ |
| F | $P_{L3}$ | | | |
| 1.5F | | $P_{E3}$ | $P_{L3}$ | $P_{E3}$ |
| 2F | $P_{L4}$ | | | |
| 2.5F | | $B_{E4}$ | $P_{L4}$ | $B_{E4}$ |
| 3F | $P_{L5}$ | | | |

TABLE 4-continued

| Time, +DTS$_{L2}$ | Decode | Decode | Present | Present |
|---|---|---|---|---|
| 3.5F | | $B_{E5}$ | $P_{L5}$ | $B_{E5}$ |
| 4F | $P_{L6}$ | | | |
| 4.5F | | $P_{E5}$ | $P_{L6}$ | $P_{E6}$ |
| 5F | $P_{L7}$ | | | |
| 5.5F | | $B_{E7}$ | $P_{L7}$ | $B_{E7}$ |
| 6F | $I_{L8}$ | | | |
| 6.5F | | $B_{E8}$ | $I_{L8}$ | $B_{E8}$ |
| 7F | $P_{L9}$ | | | |
| 7.5F | | $P_{E9}$ | $P_{L9}$ | $P_{E9}$ |
| 8F | $P_{L10}$ | | | |
| 8.5F | | $B_{E10}$ | $P_{L10}$ | $B_{E10}$ |
| 9F | $P_{L11}$ | | | |
| 9.5F | | $B_{E11}$ | $P_{L11}$ | $B_{E11}$ |
| 10F | $P_{L12}$ | | | |
| 10.5F | | $I_{E12}$ | $P_{L12}$ | $I_{E12}$ |

Here, storage for only one decoded picture is required. For instance, $I_{L2}$ is decoded and stored prior to $B_{E2}$ being received, at which time $B_{E2}$ can be decoded and directly output for presentation concurrently with $I_{L2}$.

For the ith picture in either the lower or enhancement sequences, the DTS and PTS can be determined from DTS$_{Li}$ as follows for the transmission sequence of Table 4:

$PTS_{Li} = DTS_{Li} + 0.5F$;

$DTS_{Ei} = DTS_{Li} + 0.5F$; and $PTS_{Ei} = PTS_{Li}$.

Figure 4:
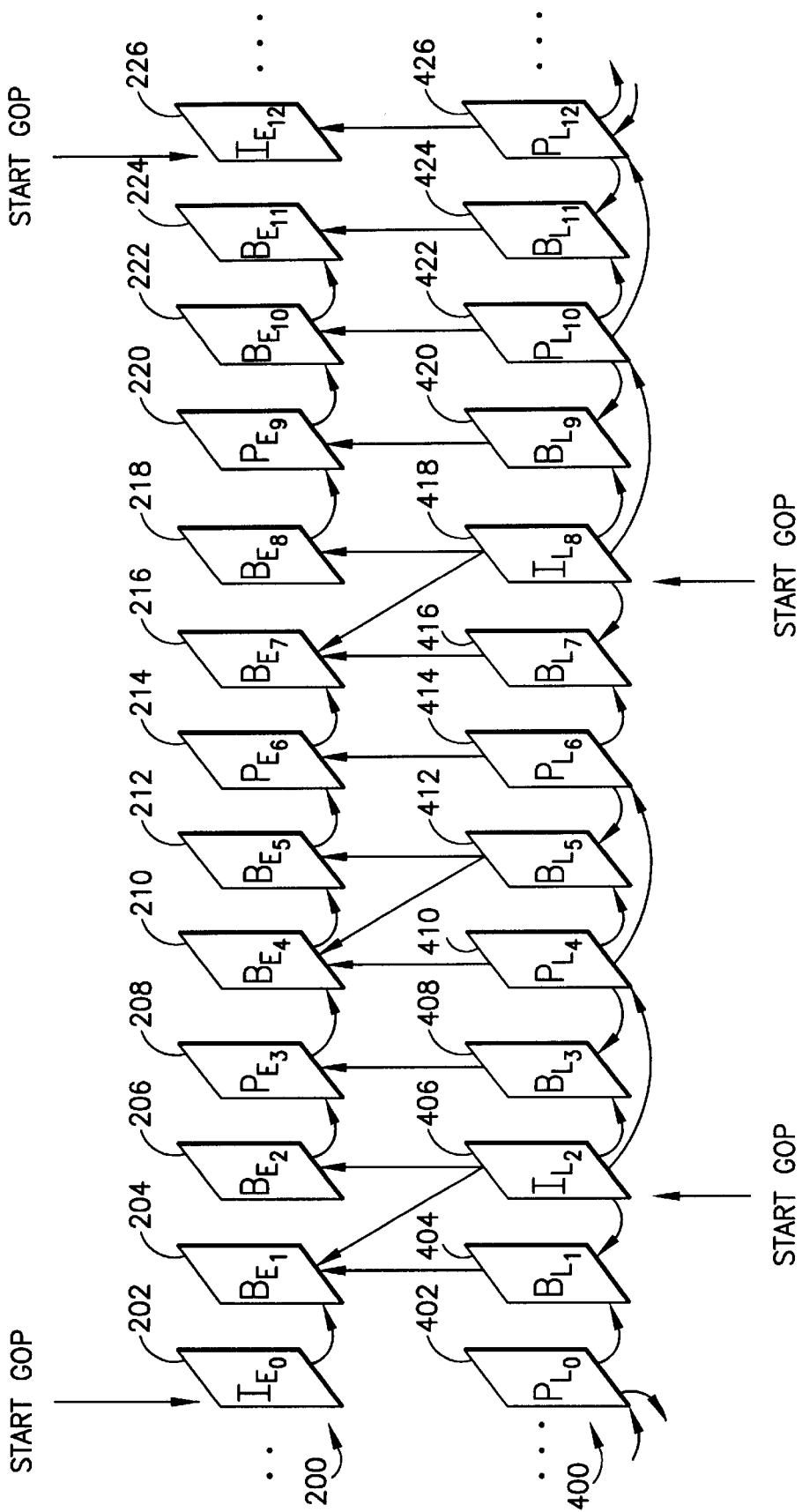
FIG. 4 is an illustration of an enhancement layer picture sequence and a third base layer picture sequence for use with the system of the present invention.

FIG. 4 is an illustration of an enhancement layer picture sequence and a third base layer picture sequence for use with the system of the present invention. Here, the lower layer includes I, P- and B-pictures, where the B-pictures are non-consecutive. Like-numbered elements correspond to the elements of FIGS. 2 and 3. The enhancement layer 200 is the same as previously discussed. The lower layer, shown generally at 400, includes the picture sequence $P_{L0}$ (402), $B_{L1}$ (404), $I_{L2}$ (406), $B_{L3}$ (408), $P_{L4}$ (410), $B_{L5}$ (412), $P_{L6}$ (414), $B_{L7}$ (416), $I_{L8}$ (418), $B_{L9}$ (420), $P_{L10}$ (422), $B_{L11}$ (424) and $P_{L12}$ (426). GOPs start at $I_{L2}$ (406) and $I_{L8}$ (418).

Here, the prediction scheme is as follows. Recall that, in the base layer, a B-picture is predictive-coded using the closest previous I- or P-picture, and the closest subsequent I- or P-picture. Thus, in the lower layer sequence 400, for example, $B_{L3}$ is coded using $I_{L2}$ and $P_{L4}$. A suitable picture transmission sequence in accordance with the present invention, beginning at $I_{L2}$, is: $I_{L2}$, $P_{L4}$, $B_{L3}$, $B_{E2}$, $P_{E3}$, $P_{L6}$, $B_{L5}$, $B_{E4}$, $B_{E5}$, $I_{L8}$, $B_{L7}$, $P_{E6}$, $B_{E7}$, $P_{L10}$, $B_{L9}$, $B_{E8}$, $P_{E9}$, $P_{L12}$, $B_{L11}$, $B_{E10}$, $B_{E11}$, and so on (sequence 5). Alternatively, another suitable transmission sequence is: $I_{L2}$, $B_{E2}$, $P_{L4}$, $B_{L3}$, $P_{E3}$, $B_{E4}$, $P_{L6}$, $B_{L5}$, $B_{E5}$, $P_{E6}$, $I_{L8}$, $B_{L7}$, $B_{E7}$, $B_{E8}$, $P_{L10}$, $B_{L9}$, $P_{E9}$, $B_{E10}$, $P_{L12}$, $B_{L11}$, $B_{E11}$, $I_{E12}$, and so on (sequence 6). A further suitable transmission sequence is: $I_{L2}$, $P_{L4}$, $B_{E2}$, $B_{L3}$, $P_{E3}$, $P_{L6}$, $B_{E4}$, $B_{L5}$, $B_{E5}$, $I_{L8}$, $P_{E6}$, $B_{L7}$, $B_{E7}$, $P_{L10}$, $B_{E8}$, $B_{L9}$, $P_{E9}$, $P_{L12}$, $B_{E10}$, $B_{L11}$, $B_{E11}$, and so on (sequence 7).

For the ith picture in either the lower or enhancement sequences, the DTS and PTS can be determined from DTS$_{Li}$ as follows. For each picture, the presentation of the picture is delay by an integer multiple of F following the decoding of the picture.

For example, with the first transmission sequence above, i.e., sequence 5, the decoding and presenting occurs as described in Table 5 below.

TABLE 5

| Time, +DTS$_{L2}$ | Decode | Decode | Present | Present |
|---|---|---|---|---|
| 0 | $I_{L2}$ | | | |
| 0.5F | $P_{L4}$ | | | |
| F | $B_{L3}$ | | | |
| 1.5F | | $B_{E2}$ | $I_{L2}$ | $B_{E2}$ |
| 2F | | $P_{E3}$ | | |
| 2.5F | $P_{L6}$ | | $B_{L3}$ | $P_{E3}$ |
| 3F | $B_{L5}$ | | | |
| 3.5F | | $B_{E4}$ | $P_{L4}$ | $B_{E4}$ |
| 4F | | $B_{E5}$ | | |
| 4.5F | $I_{L8}$ | | $B_{L5}$ | $B_{E5}$ |
| 5F | $B_{L7}$ | | | |
| 5.5F | | $P_{E6}$ | $P_{L6}$ | $P_{E6}$ |
| 6F | | $B_{E7}$ | | |
| 6.5F | $P_{L10}$ | | $B_{L7}$ | $B_{E7}$ |
| 7F | $B_{L9}$ | | | |
| 7.5F | | $B_{E8}$ | $I_{L8}$ | $B_{E8}$ |
| 8F | | $P_{E9}$ | | |
| 8.5F | $P_{L12}$ | | $B_{L9}$ | $P_{E9}$ |
| 9F | $B_{L11}$ | | | |
| 9.5F | | $B_{E10}$ | $P_{L10}$ | $B_{E10}$ |
| 10F | | $B_{E11}$ | | |
| 10.5F | | | $B_{L11}$ | $B_{E11}$ |

Here, storage for only three decoded pictures is required. For instance, $I_{L2}$, $P_{L4}$ and $B_{L3}$ are decoded and stored prior to $B_{E2}$ being received, at which time $B_{E2}$ can then be decoded and directly output for presentation concurrently with $I_{L2}$.

For the ith picture in either the lower or enhancement sequences, the DTS and PTS can be determined from DTS$_{Li}$ as follows for the transmission sequence of Table 5:

$PTS_{Li}=DTS_{Li}+(mod2(i+1)+1)1.5F$, for all i;
$DTS_{Ei}=DTS_{Li}+1.5F$, for i=2;
$DTS_{Ei}=DTS_{Li}+(1+2mod2(i+1))F$, for i>2; and
$PTS_{Ei}=PTS_{Li}$, for all i;

where mod2(i) is the base 2 modulo of the integer i such that mod2(i)=0 when i is even, and mod2(i)=1 when i is odd.

With sequence 6, the decoding and presenting occurs as described in Table 6 below.

TABLE 6

| Time, +DTS$_{L2}$ | Decode | Decode | Present | Present |
|---|---|---|---|---|
| 0 | $I_{L2}$ | | | |
| 0.5F | | $B_{E2}$ | | |
| F | $P_{L4}$ | | $I_{L2}$ | $B_{E2}$ |
| 1.5F | $B_{L3}$ | | | |
| 2F | | $P_{E3}$ | $B_{L3}$ | $P_{E3}$ |
| 2.5F | | $B_{E4}$ | | |
| 3F | $P_{L6}$ | | $P_{L4}$ | $B_{E4}$ |
| 3.5F | $B_{L5}$ | | | |
| 4F | | $B_{E5}$ | $B_{L5}$ | $B_{E5}$ |
| 4.5F | | $P_{E6}$ | | |
| 5F | $I_{L8}$ | | $P_{L6}$ | $P_{E6}$ |
| 5.5F | $B_{L7}$ | | | |
| 6F | | $B_{E7}$ | $B_{L7}$ | $B_{E7}$ |
| 6.5F | | $B_{E8}$ | | |
| 7F | $P_{L10}$ | | $I_{L8}$ | $B_{E8}$ |
| 7.5F | $B_{L9}$ | | | |
| 8F | | $P_{E9}$ | $B_{L9}$ | $P_{E9}$ |
| 8.5F | | $B_{E10}$ | | |
| 9F | $P_{L12}$ | | $P_{L10}$ | $B_{E10}$ |
| 9.5F | $B_{L11}$ | | | |
| 10F | | $B_{E11}$ | $B_{L11}$ | $B_{E11}$ |
| 10.5F | | $I_{E12}$ | | |
| 11F | | | $P_{L12}$ | $I_{E12}$ |

Here, storage for only two decoded pictures is required. For instance, $P_{L4}$ and $B_{L3}$ are decoded and stored prior to $P_{E3}$ being received, at which time $P_{E3}$ is decoded and directly output for presentation concurrently with $I_{L2}$.

For the ith picture in either the lower or enhancement sequence, the DTS and PTS can be determined from DTS$_{Li}$ as follows for the transmission sequence of Table 6:

$PTS_{Li}=DTS_{Li}+F$, for i=2;
$PTS_{Li}=DTS_{Li}+(3mod2(i+1)+1)0.5F$, for i>2;
$DTS_{Ei}=DTS_{Li}+0.5F$, for i=2;
$DTS_{Ei}=DTS_{Li}+(1+2mod2(i+1))0.5F$, for i>2; and
$PTS_{Ei}=PTS_{Li}$, for all i;

With sequence 7, the decoding and presenting occurs as described in Table 7 below.

TABLE 7

| Time, +DTS$_{L2}$ | Decode | Decode | Present | Present |
|---|---|---|---|---|
| 0 | $I_{L2}$ | | | |
| 0.5F | $P_{L4}$ | | | |
| F | | $B_{E2}$ | $I_{L2}$ | $B_{E2}$ |
| 1.5F | $B_{L3}$ | | | |
| 2F | | $P_{E3}$ | $B_{L3}$ | $P_{E3}$ |
| 2.5F | $P_{L6}$ | | | |
| 3F | | $B_{E4}$ | $P_{L4}$ | $B_{E4}$ |
| 3.5F | $B_{L5}$ | | | |
| 4F | | $B_{E5}$ | $B_{L5}$ | $B_{E5}$ |
| 4.5F | $I_{L8}$ | | | |
| 5F | | $P_{E6}$ | $P_{L6}$ | $P_{E6}$ |
| 5.5F | $B_{L7}$ | | | |
| 6F | | $B_{E7}$ | $B_{L7}$ | $B_{E7}$ |
| 6.5F | $P_{L10}$ | | | |
| 7F | | $B_{E8}$ | $I_{L8}$ | $B_{E8}$ |
| 7.5F | $B_{L9}$ | | | |
| 8F | | $P_{E9}$ | $B_{L9}$ | $P_{E9}$ |
| 8.5F | $P_{L12}$ | | | |
| 9F | | $B_{E10}$ | $P_{L10}$ | $B_{E10}$ |
| 9.5F | $B_{L11}$ | | | |
| 10F | | $B_{E11}$ | $B_{L11}$ | $B_{E11}$ |
| 10.5F | | | | |
| 11F | | | $P_{L12}$ | $I_{E12}$ |

Here, storage for only two decoded pictures is required. For instance, $I_{L2}$ and $P_{L4}$ are decoded and stored prior to $B_{E2}$ being received, at which time $B_{E2}$ is decoded and directly output for presentation concurrently with $I_{L2}$.

For the ith picture in either the lower or enhancement sequences, the DTS and PTS can be determined from DTS$_{Li}$ as follows for the transmission sequence of Table 7:

$PTS_{Li}=DTS_{Li}+F$, for i=2;
$PTS_{Li}=DTS_{Li}+(4mod2(i+1)+1)0.5F$, for i>2;
$DTS_{Ei}=DTS_{Li}+F$, for i=2;
$DTS_{Ei}=DTS_{Li}+(4mod2(i+1)+1)0.5F$, for i>2; and
$PTS_{Ei}=PTS_{Li}$, for all i.

Figure 5:
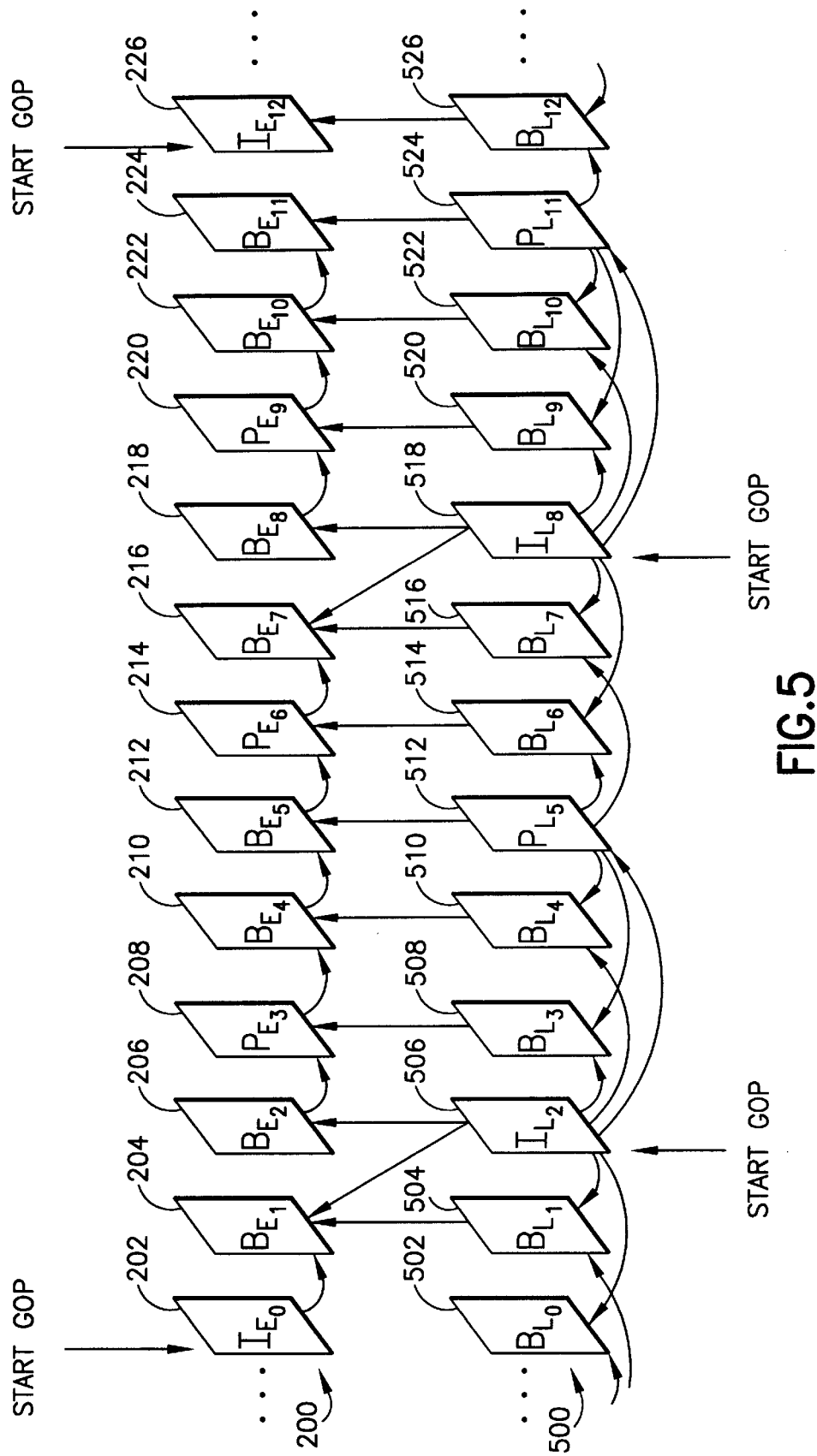
FIG. 5 is an illustration of an enhancement layer picture sequence and a fourth base layer picture sequence for use with the system of the present invention.

FIG. 5 is an illustration of an enhancement layer picture sequence and a fourth base layer picture sequence for use with the system of the present invention. Here, the lower layer includes I, P- and B-pictures, with two consecutive B-pictures. Like-numbered elements correspond to the elements of FIGS. 2–4. The enhancement layer 200 is the same as previously discussed. The lower layer, shown generally at 500, includes the picture sequence $B_{L0}$ (502), $B_{L1}$ (504), $I_{L2}$ (506), $B_{L3}$ (508), $B_{L4}$ (510), $P_{L5}$ (512), $B_{L6}$ (514), $B_{L7}$ (516), $I_{L8}$ (518), $B_{L9}$ (520), $B_{L10}$ (522), $P_{L11}$ (524) and $B_{L12}$ (526). GOPs start at $I_{L2}$ (506) and $I_{L8}$ (518).

A suitable picture transmission sequence in accordance with the present invention, beginning at $I_{L2}$, is: $I_{L2}$, $P_{L5}$, $B_{L3}$, $B_{E2}$, $B_{L4}$, $P_{E3}$, $B_{E4}$, $I_{L8}$, $B_{L6}$, $B_{E5}$, $B_{L7}$, $P_{E6}$, $B_{E7}$, $P_{L11}$, $B_{L9}$, $B_{E8}$, $B_{L10}$, $P_{E9}$, $B_{E10}$ and so on (sequence 8). With this transmission sequence, the decoding and presenting occurs as described in Table 8 below.

TABLE 8

| Time, +DTS$_{L2}$ | Decode | Decode | Present | Present |
|---|---|---|---|---|
| 0 | I$_{L2}$ | | | |
| 0.5F | P$_{L5}$ | | | |
| F | B$_{L3}$ | | | |
| 1.5F | | B$_{E2}$ | I$_{L2}$ | B$_{E2}$ |
| 2F | B$_{L4}$ | | | |
| 2.5F | | P$_{E3}$ | B$_{L3}$ | P$_{E3}$ |
| 3F | | B$_{E4}$ | | |
| 3.5F | I$_{L8}$ | | B$_{L4}$ | B$_{E4}$ |
| 4F | B$_{L6}$ | | | |
| 4.5F | | B$_{E5}$ | P$_{L5}$ | B$_{E5}$ |
| 5F | B$_{L7}$ | | | |
| 5.5F | | P$_{E6}$ | B$_{L6}$ | P$_{E6}$ |
| 6F | | B$_{E7}$ | | |
| 6.5F | P$_{L11}$ | | B$_{L7}$ | B$_{E7}$ |
| 7F | B$_{L9}$ | | | |
| 7.5F | | B$_{E8}$ | I$_{L8}$ | B$_{E8}$ |
| 8F | B$_{L10}$ | | | |
| 8.5F | | P$_{E9}$ | B$_{L9}$ | P$_{E9}$ |
| 9F | | B$_{E10}$ | | |
| 9.5F | | | B$_{L10}$ | B$_{E10}$ |
| 10F | | | | |
| 10.5F | | | P$_{L11}$ | |

Here, storage for only three decoded pictures is required. For instance, I$_{L2}$, P$_{L5}$ and B$_{L3}$ are decoded and stored prior to B$_{E2}$ being received, at which time B$_{E2}$ is decoded and directly output for presentation concurrently with I$_{L2}$.

For the ith picture in either the lower or enhancement sequences, the DTS and PTS can be determined from DTS$_{Li}$ as follows for the transmission sequence of Table 8:

PTS$_{Li}$=DTS$_{Li}$+1.5F, for i=2;

PTS$_{Li}$=DTS$_{Li}$+(5mod2(mod3(i−1))+3)0.5F, for i>2;

DTS$_{Ei}$=DTS$_{Li}$+1.5F, for i=2;

DTS$_{Ei}$=DTS$_{Li}$+(3−mod2(mod3(i)) +5mod2(mod3(i−1)) 0.5F, for i>2; and

PTS$_{Ei}$=PTS$_{Li}$, for all i;

where mod3(i) is the base 3 modulo of the integer i such that mod2(i)=0 when i=0+3n, mod3(i)=1 when i=1+3n, and mod3(i)=2 when i=2+3n, for n=0, 1, 2, 3, etc.

Alternatively, another suitable transmission sequence is: I$_{L2}$, B$_{E2}$, P$_{L5}$, B$_{L3}$, P$_{E3}$, B$_{L4}$, B$_{E4}$, B$_{E5}$, I$_{L8}$, B$_{L6}$, P$_{E6}$, I$_{L7}$, B$_{E7}$, B$_{E8}$, P$_{L11}$, B$_{L9}$, P$_{E9}$, B$_{L10}$, B$_{E10}$, B$_{E11}$ and so on (sequence 9). With this transmission sequence, the decoding and presenting occurs as described in Table 9 below.

TABLE 9

| Time, +DTS$_{L2}$ | Decode | Decode | Present | Present |
|---|---|---|---|---|
| 0 | I$_{L2}$ | | | |
| 0.5F | | B$_{E2}$ | | |
| F | P$_{L5}$ | | I$_{L2}$ | B$_{E2}$ |
| 1.5F | B$_{L3}$ | | | |
| 2F | | P$_{E3}$ | B$_{L3}$ | P$_{E3}$ |
| 2.5F | B$_{L4}$ | | | |
| 3F | | B$_{E4}$ | B$_{L4}$ | B$_{E4}$ |
| 3.5F | | B$_{E5}$ | | |
| 4F | I$_{L8}$ | | P$_{L5}$ | B$_{E5}$ |
| 4.5F | B$_{L6}$ | | | |
| 5F | | P$_{E6}$ | B$_{L6}$ | P$_{E6}$ |
| 5.5F | B$_{L7}$ | | | |
| 6F | | B$_{E7}$ | B$_{L7}$ | B$_{E7}$ |
| 6.5F | | B$_{E8}$ | | |
| 7F | P$_{L11}$ | | I$_{L8}$ | B$_{E8}$ |
| 7.5F | B$_{L9}$ | | | |
| 8F | | P$_{E9}$ | B$_{L9}$ | P$_{E9}$ |
| 8.5F | B$_{L10}$ | | | |
| 9F | | B$_{E10}$ | B$_{L10}$ | B$_{E10}$ |
| 9.5F | | B$_{E11}$ | | |
| 10F | | | P$_{L11}$ | B$_{E11}$ |

Here, storage for only two decoded pictures is required. For instance, I$_{L2}$ and B$_{E2}$ are decoded and stored prior to P$_{L5}$ being received, at which time B$_{E2}$ and I$_{L2}$ are output for concurrent presentation.

For the ith picture in either the lower or enhancement sequences, the DTS and PTS can be determined from DTS$_{Li}$ as follows for the transmission sequence of Table 9:

PTS$_{Li}$=DTS$_{Li}$+F, for i=2;

PTS$_{Li}$=DTS$_{Li}$+(5mod2(mod3(i−1))+1)0.5F, for i>2;

DTS$_{Ei}$=DTS$_{Li}$+0.5F, for i=2;

DTS$_{Ei}$=DTS$_{Li}$+(5mod2(mod3(i−1))+1)0.5F, for i>2; and

PTS$_{Ei}$=PTS$_{Li}$, for all i.

A further suitable transmission sequence is: I$_{L2}$, P$_{L5}$, B$_{E2}$, B$_{L3}$, P$_{E3}$, B$_{L4}$, B$_{E4}$, I$_{L8}$, B$_{E5}$, B$_{L6}$, P$_{E6}$, B$_{L7}$, B$_{E7}$, P$_{L11}$, B$_{E8}$, B$_{L9}$, P$_{E9}$, B$_{L10}$, B$_{E10}$ and so on (sequence 10). With this transmission sequence, the decoding and presenting occurs as described in Table 10 below.

TABLE 10

| Time, +DTS$_{L2}$ | Decode | Decode | Present | Present |
|---|---|---|---|---|
| 0 | I$_{L2}$ | | | |
| 0.5F | P$_{L5}$ | | | |
| F | | B$_{E2}$ | I$_{L2}$ | B$_{E2}$ |
| 1.5F | B$_{L3}$ | | | |
| 2F | | P$_{E3}$ | B$_{L3}$ | P$_{E3}$ |
| 2.5F | B$_{L4}$ | | | |
| 3F | | B$_{E4}$ | B$_{L4}$ | B$_{E4}$ |
| 3.5F | I$_{L8}$ | | | |
| 4F | | B$_{E5}$ | P$_{L5}$ | B$_{E5}$ |
| 4.5F | B$_{L6}$ | | | |
| 5F | | P$_{E6}$ | B$_{L6}$ | P$_{E6}$ |
| 5.5F | B$_{L7}$ | | | |
| 6F | | B$_{E7}$ | B$_{L7}$ | B$_{E7}$ |
| 6.5F | P$_{L11}$ | | | |
| 7F | | B$_{E8}$ | I$_{L8}$ | B$_{E8}$ |
| 7.5F | B$_{L9}$ | | | |
| 8F | | P$_{E9}$ | B$_{L9}$ | P$_{E9}$ |
| 8.5F | B$_{L10}$ | | | |
| 9F | | B$_{E10}$ | B$_{L10}$ | B$_{E10}$ |
| 9.5F | | | | |
| 10F | | | P$_{L11}$ | B$_{E11}$ |

Here, storage for only two decoded pictures is required. For instance, I$_{L2}$ and P$_{L5}$ are decoded and stored prior to B$_{E2}$ being received, at which time B$_{E2}$ is decoded and directly output for concurrent presentation with I$_{L2}$.

For the ith picture in either the lower or enhancement sequences, the DTS and PTS can be determined from DTS$_{Li}$ as follows for the transmission sequence of Table 10:

PTS$_{Li}$=DTS$_{Li}$+F, for i=2;

PTS$_{Li}$=DTS$_{Li}$+(6mod2(mod3(i−1))+1)0.5F, for i>2;

DTS$_{Ei}$=DTS$_{Li}$+F, for i=2;

DTS$_{Ei}$=DTS$_{Li}$+(6mod2(mod3(i−1))+1)0.5F, for i>2; and

PTS$_{Ei}$=PTS$_{Li}$, for all i.

Note that, in each of the above cases with sequences 1–10, serial decoding was assumed. When parallel decoding is used, the relationship between the PTS and DTS can be characterized in a more general manner. Specifically, when the lower layer has no B-pictures, but has only I and/or P-pictures, all pictures in both layers arrive in presentation order at the decoder. Thus, for the ith picture in either the lower or enhancement sequences, the DTS and PTS can be determined from DTS$_{Li}$ as follows:

PTS$_{Li}$=DTS$_{Li}$+F;

DTS$_{Ei}$=DTS$_{Li}$+F; and

PTS$_{Ei}$=PTS$_{Li}$.

This relationship is illustrated in an example shown in Table 11 below. The difference between DTS$_{Li}$ and DTS$_{L(i−1)}$ is F.

TABLE 11

| Pic. No. | Pic. type, lower layer | $DTS_L$ | $PTS_L$ | Pic. type, enhancement layer | $DTS_E$ | $PTS_E$ |
|---|---|---|---|---|---|---|
| 0 | I | $DTS_{L0}$ | $DTS_{L0} + F$ | I, P | $DTS_{L0} + F$ | $DTS_{L0} + F$ |
| 1 | I, P | $DTS_{L1}$ | $DTS_{L1} + F$ | I, P, B | $DTS_{L1} + F$ | $DTS_{L1} + F$ |
| 2 | I, P | $DTS_{L2}$ | $DTS_{L2} + F$ | I, P, B | $DTS_{L2} + F$ | $DTS_{L2} + F$ |
| 3 | I, P | $DTS_{L3}$ | $DTS_{L3} + F$ | I, P, B | $DTS_{L3} + F$ | $DTS_{L3} + F$ |

For example, referring to sequence 1 discussed in connection with FIG. 2 above, decoding and presenting will occur as illustrated in Table 12 below.

TABLE 12

| Time, $+DTS_{L2}$ | Decode | Decode | Present | Present |
|---|---|---|---|---|
| 0 | $I_{L2}$ | $B_{E1}$ | $I_{L1}$ | $B_{E1}$ |
| F | $I_{L3}$ | $B_{E2}$ | $I_{L2}$ | $B_{E2}$ |
| 2F | $I_{L4}$ | $P_{E3}$ | $I_{L3}$ | $B_{E3}$ |
| 3F | $I_{L5}$ | $B_{E4}$ | $I_{L4}$ | $B_{E4}$ |
| 4F | $I_{L6}$ | $B_{E5}$ | $I_{L5}$ | $B_{E5}$ |
| 5F | $I_{L7}$ | $P_{E6}$ | $I_{L6}$ | $P_{E6}$ |

TABLE 12-continued

| Time, $+DTS_{L2}$ | Decode | Decode | Present | Present |
|---|---|---|---|---|
| 6F | $I_{L8}$ | $B_{E7}$ | $I_{L7}$ | $B_{E7}$ |
| 7F | $I_{L9}$ | $B_{E8}$ | $I_{L8}$ | $B_{E8}$ |
| 8F | $I_{L10}$ | $P_{E9}$ | $I_{L9}$ | $P_{E9}$ |
| 9F | $I_{L11}$ | $B_{E10}$ | $I_{L10}$ | $B_{E10}$ |
| 10F | $I_{L12}$ | $BE_{11}$ | $I_{L11}$ | $B_{E11}$ |

Here, storage for only one decoded picture is required. For instance, $I_{L2}$ is decoded and stored prior to $B_{E2}$ being received. When received, $B_{E2}$ is immediately decoded and output for presentation substantially concurrently with $I_{L2}$.

When the lower layer has non-consecutive B-pictures, the DTS and PTS can be determined from $DTS_{Li}$ as follows. If the ith picture in the lower layer is an I-Picture with a "closed GOP" indicator or a P-picture followed by such a I-picture, then $PTS_{Li}=DTS_{Li}+2F$. If the ith picture in the lower layer is a P-Picture or an I-Picture of an "open GOP" and the (i+1)th picture is not an I-picture with a "closed GOP" indicator, then $PTS_{Li}=DTS_{Li}+3F$. If the ith picture in the lower layer is a B-picture, then $PTS_{Li}=DTS_{Li}+F$. For the enhancement layer, $DTS_{Ei}=DTS_{Li}+2F$ and $PTS_{Ei}=DTS_{Li}+2F$. Note that in the MPEG-2 video protocol, a group of pictures header is included at the beginning of a GOP and is set with a one bit indicator, closed_gop=0, while closed_gop=1 indicates a closed GOP. An open GOP I-picture is treated like a P-picture in terms of decoding order.

Decoding and presenting with non-consecutive B-pictures in the lower layer is illustrated in an example in Table 13 below.

TABLE 13

| Pic. No. | Pic. type, lower layer | $DTS_L$ | $PTS_L$ | Pic. type, enhancement layer | $DTS_E$ | $PTS_E$ |
|---|---|---|---|---|---|---|
| 0 | I (closed GOP) | $DTS_{L0}$ | $DTS_{L0} + 2F$ | I, P | $DTS_{L0} + 2F$ or $DTS_{L0} + F$ | $DTS_{L0} + 2F$ |
| 1 | P | $DTS_{L1}$ | $DTS_{L1} + 3F$ | I, P, B | $DTS_{L1} + 2F$ | $DTS_{L1} + F$ |
| 2 | B | $DTS_{L2}$ | $DTS_{L2} + 3F$ | I, P, B | $DTS_{L2} + 2F$ | $DTS_{L2} + F$ |
| 3 | P | $DTS_{L3}$ | $DTS_{L3} + 3F$ | I, P, B | $DTS_{L3} + 2F$ | $DTS_{L3} + F$ |
| 4 | B | $DTS_{L4}$ | $DTS_{L4} + F$ | I, P, B | $DTS_{L4} + 2F$ | $DTS_{L4} + 2F$ |
| 5 | I (open GOP) | $DTS_{L5}$ | $DTS_{L5} + 3F$ | I, P, B | $DTS_{L5} + 2F$ | $DTS_{L5} + 2F$ |
| 6 | B | $DTS_{L6}$ | $DTS_{L6} + F$ | I, P, B | $DTS_{L6} + 2F$ | $DTS_{L6} + 2F$ |
| 7 | I (closed GOP) | $DTS_{L7}$ | $DTS_{L7} + 2F$ | I, P, B | $DTS_{L7} + 2F$ | $DTS_{L7} + 2F$ |

In a specific example, the lower layer sequence, in display order, is $I_{L0}, B_{L1}, P_{L2}, B_{L3}, P_{L4}, B_{L5}, I_{L6}, I_{L7}$, and so on. The enhancement layer sequence, in display and transmission order, is $P_{E0}, B_{E1}, B_{E2}, B_{E3}, B_{E4}, B_{E5}, P_{E6}, P_{E7}$, and so on. One possible transmission order in accordance with the present invention is $I_{L0}, P_{L2}, B_{L1}, P_{E0}, P_{L4}, B_{E1}, B_{L3}, B_{E2}, I_{L6}, B_{E3}, B_{L5}, B_{E4}, I_{L7}, B_{E5}$ and so on. The DTS and PTS can be determined as shown in Table 14.

TABLE 14

| Time, $+DTS_{L2}$ | Decode | Decode | Present | Present |
|---|---|---|---|---|
| 0 | $I_{L0}$ | | | |
| F | $P_{L2}$ | | | |
| 2F | $B_{L1}$ | $P_{E0}$ | $I_{L0}$ | $P_{E0}$ |
| 3F | $P_{L4}$ | $B_{E1}$ | $B_{L1}$ | $B_{E2}$ |
| 4F | $B_{L3}$ | $B_{E2}$ | $P_{L2}$ | $B_{E2}$ |
| 5F | $I_{L6}$ | $B_{E3}$ | $B_{L3}$ | $B_{E3}$ |
| 6F | $B_{L5}$ | $B_{E4}$ | $P_{L4}$ | $B_{E4}$ |
| 7F | $I_{L7}$ | $B_{E5}$ | $B_{L5}$ | $B_{E5}$ |

TABLE 14-continued

| Time, +DTS$_{L2}$ | Decode | Decode | Present | Present |
|---|---|---|---|---|
| 8F | | P$_{E6}$ | I$_{L6}$ | P$_{E6}$ |
| 9F | | P$_{E7}$ | I$_{L7}$ | P$_{E7}$ |

When the lower layer has two consecutive B-pictures, the DTS and PTS are computed by the following rules. If the ith picture in the lower layer is an I-Picture with a closed GOP indicator or a P-picture followed by such an I-picture, then PTS$_{Li}$=DTS$_{Li}$+2F. If the ith picture in the lower layer is a P-picture or an I-picture of an open GOP and the (i+1)th picture is not an I-picture with a closed GOP indicator, then PTS$_{Li}$=DTS$_{Li}$+4F. If the ith picture in the lower layer is a B-picture, then PTS$_{Li}$=DTS$_{Li}$+F. For the enhancement layer, DTS$_{Ei}$=DTS$_{Li}$+2F and PTS$_{Ei}$=DTS$_{Li}$+2F.

Decoding and presenting with two consecutive B-pictures in the lower layer is illustrated in an example in Table 15 below.

TABLE 15

| Pic. No. | Pic. type, lower layer | DTS$_L$ | PTS$_L$ | Pic. type, enhancement layer | DTS$_E$ | PTS$_E$ |
|---|---|---|---|---|---|---|
| 0 | I (closed GOP) | DTS$_{L0}$ | DTS$_{L0}$ + 2F | I, P | DTS$_{L0}$ + 2F DTS$_{L0}$ + F | DTS$_{L0}$ + 2F |
| 1 | P | DTS$_{L1}$ | DTS$_{L1}$ + 4F | I, P, B | DTS$_{L1}$ + 2F | DTS$_{L1}$ + 2F |
| 2 | B | DTS$_{L2}$ | DTS$_{L2}$ + F | I, P, B | DTS$_{L2}$ + 2F | DTS$_{L2}$ + 2F |
| 3 | B | DTS$_{L3}$ | DTS$_{L3}$ + F | I, P, B | DTS$_{L3}$ + 2F | DTS$_{L3}$ + 2F |
| 4 | I (open GOP) | DTS$_{L4}$ | DTS$_{L4}$ + 4F | I, P, B | DTS$_{L4}$ + 2F | DTS$_{L4}$ + 2F |
| 5 | B | DTS$_{L5}$ | DTS$_{L5}$ + F | I, P, B | DTS$_{L5}$ + 2F | DTS$_{L5}$ + 2F |
| 6 | B | DTS$_{L4}$ | DTS$_{L6}$ + F | I, P, B | DTS$_{L6}$ + 2F | DTS$_{L6}$ + 2F |
| 7 | P | DTS$_{L7}$ | DTS$_{L7}$ + 2F | I, P, B | DTS$_{L7}$ + 2F | DTS$_{L7}$ + 2F |
| 8 | I (closed GOP) | DTS$_{L8}$ | DTS$_{L8}$ + 2F | I, P, B | DTS$_{L8}$ + 2F | DTS$_{L8}$ + 2F |

In a specific example, the lower layer sequence, in display order, is I$_{L0}$, B$_{L1}$, B$_{L2}$, P$_{L3}$, B$_{L4}$, B$_{L5}$, I$_{L6}$, I$_{L7}$, and so on. The enhancement layer sequence, in display and transmission order, is P$_{E0}$, B$_{E1}$, B$_{E2}$, B$_{E3}$, B$_{E4}$, B$_{E5}$, P$_{E6}$, P$_{E7}$, and so on. One possible transmission order in accordance with the present invention is I$_{L0}$, P$_{L3}$, B$_{L1}$, P$_{E0}$, B$_{L2}$, B$_{E1}$, I$_{L6}$, B$_{E2}$, B$_{L4}$, B$_{E3}$, B$_{L5}$, D$_{E4}$, I$_{L7}$, B$_{E5}$ and so on. The DTS and PTS can be determined as shown in Table 16.

TABLE 16

| Time, +DTS$_{L2}$ | Decode | Decode | Present | Present |
|---|---|---|---|---|
| 0 | I$_{L0}$ | | | |
| F | P$_{L3}$ | | | |
| 2F | B$_{L1}$ | P$_{E0}$ | I$_{L0}$ | P$_{E0}$ |
| 3F | B$_{L2}$ | B$_{E1}$ | B$_{L1}$ | B$_{E2}$ |
| 4F | I$_{L6}$ | B$_{E2}$ | B$_{L2}$ | B$_{E2}$ |
| 5F | B$_{L4}$ | B$_{E3}$ | P$_{L3}$ | B$_{E3}$ |
| 6F | B$_{L5}$ | B$_{E4}$ | B$_{L4}$ | B$_{E4}$ |
| 7F | I$_{L7}$ | B$_{E5}$ | B$_{L5}$ | B$_{E5}$ |
| 8F | | P$_{E6}$ | I$_{L6}$ | P$_{E6}$ |
| 9F | | P$_{E7}$ | I$_{L7}$ | P$_{E7}$ |

The above rules, which apply to frame mode video, can be generalized to the corresponding cases of film mode.

FIG. 6 is a block diagram of an enhancement layer decoder structure for stereoscopic video. The decoder, shown generally at 130, includes an input terminal 605 for receiving the compressed enhancement layer data, and a transport level syntax parser 610 for parsing the data. The parsed data is provided to a memory manager 630, which may comprise a central processing unit. The memory manager 630 communicates with a memory 620, which may comprise a dynamic random-access memory (DRAM), for example. The memory manager 630 also communicates with a decompression/prediction processor 640, and receives decoded lower level data via terminal 650 which may be stored temporarily in the memory 620 for subsequent use by the processor 640 in decoding disparity-predicted enhancement layer pictures.

The decompression/prediction processor 640 provides a variety of processing functions, such as error detection and correction, motion vector decoding, inverse quantization, inverse discrete cosine transformation, Huffman decoding and prediction calculations, for instance. After being processed by the decompression/prediction function 640, decoded enhancement layer data is output by the memory manager. Alternatively, the decoded data may be output directly from the decompression/prediction function 640 via means not shown.

An analogous structure may be used for the lower layer. Moreover, the enhancement and lower layer decoders may share common hardware. For example, the memory 620 and processor 640 may be shared. However, this may not be possible where parallel decoding is employed. A common clock signal (not shown) is provided such that decoding may be coordinated in accordance with the transmission sequences disclosed herein. In particular, it will be necessary to temporarily store lower layer pictures which are used for prediction of disparity-predicted enhancement layer pictures, or other lower layer pictures, prior to the reception of the predicted picture data. In accordance with the present invention, the number of pictures which must be stored prior to decoding is minimized, thereby allowing a reduced memory size.

As can be seen, the present invention provides an advantageous picture transmission scheme for a stereoscopic video picture sequence. In particular, the pictures are transmitted in an order such that the number of pictures which must be temporarily stored prior to presentation is minimized. Moreover, the example transmission sequences disclosed herein are compatible with both the MPEG-2 MVP protocol as well as the proposed MPEG-4 protocol.

Furthermore, a decode time stamp (DTS) and presentation time stamp (PTS) for each picture can be determined to provide synchronization between the lower layer and enhancement layer pictures at the decoder. The DTS and PTS are set according to whether the decoding is sequential or parallel, and whether the lower layer has no B-pictures, non-consecutive B-pictures, or two consecutive B-pictures.

Although the invention has been described in connection with various specific embodiments, those skilled in the art will appreciate that numerous adaptations and modifications may be made thereto without departing from the spirit and scope of the invention as set forth in the claims. For example, those skilled in the art will appreciate that the scheme disclosed herein may be adapted to other lower and enhancement layer sequences other than those specifically illustrated herein.

What is claimed is:

1. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes only intra-coded pictures (I-pictures), including consecutive pictures $I_{Li}$, $I_{Li+1}$, and $I_{Li+2}$, and corresponding enhancement layer pictures are represented by $H_{Ei}$, $H_{Ei+1}$, and $H_{Ei+2}$, respectively, and H designates a generic picture type, comprising the step of:

re-ordering said video pictures such that said disparity-predicted enhancement layer pictures are transmitted after said corresponding respective lower layer pictures in the order: $I_{Li}$, $I_{Li+1}$, $H_{Ei}$, $I_{Li+2}$.

2. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes only intra-coded pictures (I-pictures), including consecutive pictures $I_{Li}$ and $I_{Li+1}$, and corresponding enhancement layer pictures are represented by $H_{Ei}$ and $H_{Ei+1}$, respectively, and H designates a generic picture type, comprising the step of:

re-ordering said video pictures such that said disparity-predicted enhancement layer pictures are transmitted after said corresponding respective lower layer pictures in the order: $I_{Li}$, $H_{Ei}$, $I_{Li+1}$, $H_{Ei+1}$.

3. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes only intra-coded pictures (I-pictures) and predictive-coded pictures (P-pictures), including consecutive pictures $I_{Li}$, $P_{Li+1}$, and $P_{Li+2}$, and corresponding enhancement layer pictures are represented by $H_{Ei}$, $H_{Ei+1}$, and $H_{Ei+2}$, respectively, and H designates a generic picture type, comprising the step of:

re-ordering said video pictures such that said disparity-predicted enhancement layer pictures are transmitted after said corresponding respective lower layer picture in the order: $I_{Li}$, $P_{Li+1}$, $H_{Ei}$, $P_{Li+2}$.

4. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes only intra-coded pictures (I-pictures) and predictive-coded pictures (P-pictures), including consecutive pictures $I_{Li}$ and $P_{Li+1}$, and corresponding enhancement layer pictures are represented by $H_{Ei}$ and $H_{Ei+1}$, respectively, and H designates a generic picture type, comprising the step of:

re-ordering said video pictures such that said disparity-predicted enhancement layer pictures are transmitted after said corresponding respective lower layer pictures in the order: $I_{Li}$, $H_{Ei}$, $P_{Li+1}$, $H_{Ei+1}$.

5. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes intra-coded pictures (I-pictures), predictive-coded pictures (P-pictures), and non-consecutive bi-directional predictive-coded pictures (B-pictures), including consecutive pictures $I_{Li}$, $B_{Li+1}$ and $P_{Li+2}$, and corresponding enhancement layer pictures are represented by $H_{Ei}$, $H_{Ei+1}$ and $H_{Ei+2}$, respectively, and H designates a generic picture type, comprising the step of:

re-ordering said video pictures such that said disparity-predicted enhancement layer pictures are transmitted after said corresponding respective lower layer pictures in the order: $I_{Li}$, $P_{Li+2}$, $B_{Li+1}$, $H_{Ei}$, $H_{Ei+1}$.

6. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes intra-coded pictures (I-pictures), predictive-coded pictures (P-pictures), and non-consecutive bi-directional predictive-coded pictures (B-pictures), including consecutive pictures $I_{Li}$, $B_{Li+1}$ and $P_{Li+2}$, and corresponding enhancement layer pictures are represented by $H_{Ei}$, $H_{Ei+1}$ and $H_{Ei+2}$, respectively, and H designates a generic picture type, comprising the step of:

re-ordering said video pictures such that said disparity-predicted enhancement layer pictures are transmitted after said corresponding respective lower layer pictures in the order: $I_{Li}$, $H_{Ei}$, $P_{Li+2}$, $B_{Li+1}$, $H_{Ei+1}$, $H_{Ei+2}$.

7. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes intra-coded pictures (I-pictures), predictive-coded pictures (P-pictures), and non-consecutive bi-directional predictive-coded pictures (B-pictures), including consecutive pictures $I_{Li}$, $B_{Li+1}$ and $P_{Li+2}$, and corresponding enhancement layer pictures are represented by $H_{Ei}$, $H_{Ei+1}$ and $H_{Ei+2}$, respectively, and H designates a generic picture type, comprising the step of:

re-ordering said video pictures such that said disparity-predicted enhancement layer pictures are transmitted after said corresponding respective lower layer pictures in the order: $I_{Li}$, $P_{Li+2}$, $H_{Ei}$, $B_{Li+1}$, $H_{Ei+1}$.

8. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes intra-coded pictures (I-pictures), predictive-coded pictures (P-pictures), and consecutive bi-directional predictive-coded pictures (B-pictures), including consecutive pictures $I_{Li}$, $B_{Li+1}$, $B_{Li+2}$ and $P_{Li+3}$, and corresponding enhancement layer pictures are represented by $H_{Ei}$, $H_{Ei+1}$, $H_{Ei+2}$, and $H_{Ei+3}$, respectively, and H designates a generic picture type, comprising the step of:

re-ordering said video pictures such that said disparity-predicted enhancement layer pictures are transmitted after said corresponding respective lower layer pictures in the order: $I_{Li}$, $P_{Li+3}$, $B_{Li+1}$, $H_{Ei}$, $B_{Li+2}$, $H_{Ei+1}$, $H_{Ei+2}$.

9. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes intra-coded pictures (I-pictures), predictive-coded pictures (P-pictures), and consecutive bi-directional predictive-coded pictures (B-pictures), including consecutive pictures $I_{Li}$, $B_{Li+1}$, $B_{Li+2}$ and $P_{Li+3}$, and corresponding enhancement layer pictures are represented by $H_{Ei}$, $H_{Ei+1}$, $H_{Ei+2}$, and $H_{Ei+3}$, respectively, and H designates a generic picture type, comprising the step of:

re-ordering said video pictures such that said disparity-predicted enhancement layer pictures are transmitted after said corresponding respective lower layer pictures in the order: $I_{Li}$, $H_{Ei}$, $P_{Li+3}$, $B_{Li+1}$, $H_{Ei+1}$, $B_{Li+2}$, $H_{Ei+2}$, $H_{Ei+3}$.

10. A method for re-ordering of a sequence of video pictures in a lower layer (L) and an enhancement layer (E) of a stereoscopic video signal for transmission to a decoder, said enhancement layer including disparity-predicted pictures which are predicted using corresponding lower layer pictures, wherein said lower layer includes intra-coded pictures (I-pictures), predictive-coded pictures (P-pictures), and consecutive bi-directional predictive-coded pictures (B-pictures), including consecutive pictures $I_{Li}$, $B_{Li+1}$, $B_{Li+2}$ and $P_{Li+3}$, and corresponding enhancement layer pictures are represented by $H_{Ei}$, $H_{Ei+1}$, $H_{Ei+2}$, and $H_{Ei+3}$, respectively, and H designates a generic picture type, comprising the step of:

re-ordering said video pictures such that said disparity-predicted enhancement layer pictures are transmitted after said corresponding respective lower layer pictures in the order: $I_{Li}$, $P_{Li+3}$, $H_{Ei}$, $B_{Li+1}$, $H_{Ei+1}$, $B_{Li+2}$, $H_{Ei+2}$.

11. An encoding method to allow decoding in parallel of a sequence of video pictures in a lower layer and an enhancement layer of a stereoscopic video signal, wherein said lower layer includes at least one of intra-coded pictures (I-pictures) and predictive-coded pictures (P-pictures), but no bi-directional predictive-coded pictures (B-pictures), comprising the step of:

providing said pictures with decode time stamps (DTS) and presentation time stamps (PTS) for indicating, respectively, a time to decode and present each of said pictures; wherein:
the DTS of the ith lower layer picture is $DTS_{Li}$;
the PTS of the ith lower layer picture is $PTS_{Li}$;
the DTS of the ith enhancement layer picture is $DTS_{Hi}$;
the PTS of the ith enhancement layer picture is $PTS_{Hi}$;
F is a time interval between the presentation of successive pictures; and
$PTS_{Li}=DTS_{Hi}=PTS_{Hi}=DTS_{Li}+F$.

12. An encoding method to allow decoding in parallel of a sequence of video pictures in a lower layer and an enhancement layer of a stereoscopic video signal, wherein said lower layer includes non-consecutive bi-directional predictive-coded pictures (B-pictures), comprising the step of:

providing said pictures with decode time stamps (DTS) and presentation time stamps (PTS) for indicating, respectively, a time to decode and present each of said pictures; wherein:
the DTS of the ith lower layer picture is $DTS_{Li}$;
the PTS of the ith lower layer picture is $PTS_{Li}$;
the DTS of the ith enhancement layer picture is $DTS_{Hi}$;
the PTS of the ith enhancement layer picture is $PTS_{Hi}$;
F is a time interval between the presentation of successive pictures; and
$PTS_{Li}=DTS_{Li}+2F$ when the ith lower layer picture is an intra-coded picture (I-picture) with a closed GOP indicator.

13. The method of claim 12, wherein:
$PTS_{Li}=DTS_{Li}+2F$ when the ith lower layer picture is a predictive-coded picture (P-picture) and the (i+1)th lower layer picture is an I-picture with a closed GOP indicator.

14. The method of claim 12, wherein:
$PTS_{Li}=DTS_{Li}+3F$ when the ith lower layer picture is a P-picture indicator and the (i+1)th lower layer picture is not an I-picture with a closed GOP indicator.

15. The method of claim 12, wherein:
$PTS_{Li}=DTS_{Li}+3F$ when the ith lower layer picture is an I-picture with an open GOP indicator and the (i+1)th lower layer picture is not an I-picture with a closed GOP indicator.

16. The method of claim 12, wherein:
$PTS_{Li}=DTS_{Li}+F$ when the ith lower layer picture is a B-picture.

17. The method of claim 12, wherein:
$DTS_{Hi}=PTS_{Hi}=PTS_{Li}=DTS_{Li}+2F$.

18. An encoding method to allow decoding in parallel of a sequence of video pictures in a lower layer and an enhancement layer of a stereoscopic video signal, wherein said lower layer includes at least one group of two consecutive bi-directional predictive-coded pictures (B-pictures), comprising the step of:

providing said pictures with decode time stamps (DTS) and presentation time stamps (PTS) for indicating, respectively, a time to decode and present each of said pictures; wherein:
the DTS of the ith lower layer picture is $DTS_{Li}$;
the PTS of the ith lower layer picture is $PTS_{Li}$;
the DTS of the ith enhancement layer picture is $DTS_{Hi}$;
the PTS of the ith enhancement layer picture is $PTS_{Hi}$;
F is a time interval between the presentation of successive pictures; and
$PTS_{Li}=DTS_{Li}+2F$ when the ith lower layer picture is an intra-coded picture (I-picture) with a closed GOP indicator.

19. The method of claim 18, wherein:
$PTS_{Li}=DTS_{Li}+2F$ when the ith lower layer picture is a predictive-coded picture (P-picture) and the (i+1)th lower layer picture is an I-picture with a closed GOP indicator.

20. The method of claim 18, wherein:
$PTS_{Li}=DTS_{Li}+4F$ when the ith lower layer picture is a P-picture indicator and the (i+1)th lower layer picture is not an I-picture with a closed GOP indicator.

21. The method of claim 18, wherein:
$PTS_{Li}=DTS_{Li}+4F$ when the ith lower layer picture is an I-picture with an open GOP indicator and the (i+1)th lower layer picture is not an I-picture with a closed GOP indicator.

22. The method of claim 18, wherein:
$PTS_{Li}=DTS_{Li}+F$ when the ith lower layer picture is a B-picture.

23. The method of claim 18, wherein:
$DTS_{Hi}=PTS_{Hi}=PTS_{Li}=DTS_{Li}+2F$.

* * * * *